US012303929B1

(12) United States Patent
Fugere

(10) Patent No.: US 12,303,929 B1
(45) **Date of Patent: *May 20, 2025**

(54) MATERIAL DISPENSE TIPS

(71) Applicant: DL Technology, LLC, Haverhill, MA (US)

(72) Inventor: Jeffrey P. Fugere, Hampton Falls, NH (US)

(73) Assignee: DL Technology, LLC., Haverhill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,823

(22) Filed: May 21, 2024

Related U.S. Application Data

(63) Continuation of application No. 18/143,190, filed on May 4, 2023, now Pat. No. 12,017,247, which is a
(Continued)

(51) Int. Cl.
*B05B 1/06* (2006.01)
*B05B 1/02* (2006.01)
(Continued)

(52) U.S. Cl.
CPC .......... *B05C 17/00503* (2013.01); *B05B 1/02* (2013.01); *B05B 1/06* (2013.01);
(Continued)

(58) Field of Classification Search
CPC ...... B05B 1/06; B21K 21/08; Y10T 29/49432
See application file for complete search history.

(56) References Cited

U.S. PATENT DOCUMENTS

| | | | |
|---|---|---|---|
| 248,555 | A | 10/1881 | Clarke |
| 537,201 | A | 4/1895 | Haldeman |

(Continued)

FOREIGN PATENT DOCUMENTS

| | | |
|---|---|---|
| EP | 0110591 | 6/1984 |
| EP | 0552488 | 7/1993 |
| WO | 0001495 | 1/2000 |

OTHER PUBLICATIONS

"Material Dispense Tip" Specification, Drawings, Claims and Prosecution History of U.S. Appl. No. 15/292,427, filed Oct. 13, 2016, now U.S. Pat. No. 10,583,454, issued Mar. 10, 2020, by Jeffrey P. Fugere.

(Continued)

*Primary Examiner* — Sarang Afzali
(74) *Attorney, Agent, or Firm* — Onello & Mello, PC

(57) ABSTRACT

A dispense tip for low-volume dispensing is formed according to a process. The process comprises forming a hole through a length of a neck formed of a body of material; forming an inlet hole at a distal end of the hole, the inlet hole having a first inner diameter; forming an outlet hole at a distal end of the inlet hole, the outlet hole having a second inner diameter less than the first inner diameter, a first inner taper transitioning the inlet hole from the first inner diameter to the second inner diameter; forming an outer taper having a width that decreases along a longitudinal axis of the length of the hole in a direction of a distalmost end of the outlet hole; and reducing a width of an opening at the distalmost end of the outlet hole to a third inner diameter that is less than the second inner diameter.

12 Claims, 10 Drawing Sheets

Related U.S. Application Data continuation of application No. 17/689,050, filed on Mar. 8, 2022, now Pat. No. 11,648,581, which is a continuation of application No. 16/775,666, filed on Jan. 29, 2020, now Pat. No. 11,292,025, which is a continuation of application No. 15/292,427, filed on Oct. 13, 2016, now Pat. No. 10,583,454, which is a continuation of application No. 14/217,809, filed on Mar. 18, 2014, now Pat. No. 9,486,830, which is a continuation of application No. 12/034,313, filed on Feb. 20, 2008, now Pat. No. 8,707,559.

(60) Provisional application No. 60/890,744, filed on Feb. 20, 2007.

(51) Int. Cl.

*B05C 17/005* (2006.01)
*B21D 26/033* (2011.01)
*B21G 1/08* (2006.01)
*B21K 21/08* (2006.01)
*B21K 21/12* (2006.01)
*B21K 21/16* (2006.01)

(52) U.S. Cl.

CPC .. *B05C 17/00506* (2013.01); *B05C 17/00516* (2013.01); *B21D 26/033* (2013.01); *B21G 1/08* (2013.01); *B21K 21/08* (2013.01); *B21K 21/12* (2013.01); *B21K 21/16* (2013.01); *Y10T 29/49432* (2015.01); *Y10T 29/49433* (2015.01); *Y10T 29/49805* (2015.01); *Y10T 29/4998* (2015.01)

(56) References Cited

U.S. PATENT DOCUMENTS 796,256 A 8/1905 Sanders
1,038,231 A 9/1912 Taylor et al.
1,345,965 A 7/1920 Shute
1,397,220 A 11/1921 Lord
1,453,161 A 4/1923 Murphy et al.
1,458,718 A 6/1923 Lord
1,593,016 A 7/1926 Campbell
1,699,236 A 1/1929 Goldrick
1,730,099 A 10/1929 Tribbett
1,745,382 A 2/1930 Roger
1,746,604 A 2/1930 Piquere
2,054,881 A 9/1936 Saunders
2,165,398 A 7/1939 Mazzanobile
2,287,716 A 4/1941 Whitfield
2,269,823 A 1/1942 Kreiselman
2,410,517 A 11/1946 Muller et al.
2,506,657 A 5/1950 Webster
2,635,016 A 4/1953 Doniak
2,656,070 A 10/1953 Linder
2,729,364 A 1/1956 Ma
2,751,119 A 6/1956 Manning, Sr.
2,834,520 A 5/1958 Nyden
2,855,929 A 10/1958 Hein
2,882,045 A 4/1959 Moore
2,901,153 A 8/1959 Collins
2,906,492 A 9/1959 Conrad
2,933,259 A 4/1960 Raskin
3,072,302 A 1/1963 Giovannoni et al.
3,330,294 A 7/1967 Manning et al.
3,342,205 A 9/1967 Quinto
3,344,647 A 10/1967 Berger
3,355,766 A 12/1967 Causemann
3,379,196 A 4/1968 Mitchell
3,394,659 A 7/1968 Van Alen
3,425,414 A 2/1969 La Roche
3,473,557 A 10/1969 Loe
3,507,584 A 4/1970 Robbins, Jr.
3,545,479 A 12/1970 Winston
3,618,993 A 11/1971 Platte
3,693,844 A 9/1972 Willeke
3,693,884 A 9/1972 Snodgrass et al.
3,732,731 A 5/1973 Fussell
3,732,734 A 5/1973 Avakian
3,734,635 A 5/1973 Blach et al.
3,756,730 A 9/1973 Spatz
3,771,476 A 11/1973 Heinle
3,790,128 A 2/1974 Hempelmann et al.
3,811,601 A 5/1974 Reighard et al.
3,865,281 A 2/1975 Byrd et al.
3,938,492 A 2/1976 Mercer, Jr.
3,945,569 A 3/1976 Sperry
3,963,151 A 6/1976 North, Jr.
3,963,884 A 6/1976 Pollock
3,975,058 A 8/1976 York
3,985,032 A 10/1976 Avakian
4,004,715 A 1/1977 Williams et al.
4,040,875 A 8/1977 Noble
4,042,201 A 8/1977 O'Callaghan
4,072,330 A 2/1978 Brysch
4,077,180 A 3/1978 Agent et al.
4,116,766 A 9/1978 Poindexter et al.
4,168,942 A 9/1979 Firth
4,197,070 A 4/1980 Ko
4,239,462 A 12/1980 Dach et al.
4,258,862 A 3/1981 Thorsheim
4,312,630 A 1/1982 Travaglini
4,338,925 A 7/1982 Miller
4,339,840 A 7/1982 Monson
4,341,329 A 7/1982 Kuemmerer et al.
4,346,849 A 8/1982 Rood
4,377,894 A 3/1983 Yoshida
4,386,483 A 6/1983 Schlaefli
4,397,407 A 8/1983 Skoupi et al.
4,400,708 A 8/1983 Sachs
4,408,699 A 10/1983 Stock
4,454,745 A 6/1984 Cudini
4,465,212 A 8/1984 Boone
4,465,922 A 8/1984 Kolibas
4,471,890 A 9/1984 Dougherty
4,513,190 A 4/1985 Ellett et al.
4,523,741 A 6/1985 Chandler
4,572,103 A 2/1986 Engel
4,579,286 A 4/1986 Stoudt
4,584,964 A 4/1986 Engel
4,607,766 A 8/1986 Jones
4,610,377 A 9/1986 Rasmussen
4,629,099 A 12/1986 Jones
4,673,109 A 6/1987 Cassia
4,705,218 A 11/1987 Daniels
4,705,611 A 11/1987 Grimes et al.
4,729,544 A 3/1988 Baumann
4,743,243 A 5/1988 Vaillancourt
4,763,755 A 8/1988 Murray
4,785,996 A 11/1988 Ziecker et al.
4,803,124 A 2/1989 Kunz
4,836,422 A 6/1989 Rosenberg
4,859,073 A 8/1989 Howseman, Jr. et al.
4,917,274 A 4/1990 Asa et al.
4,919,204 A 4/1990 Baker et al.
4,935,015 A 6/1990 Hall
4,941,428 A 7/1990 Engel
4,969,602 A 11/1990 Scholl
4,974,755 A 12/1990 Sonntag
5,002,228 A 3/1991 Su
5,010,930 A 4/1991 Colu
5,052,591 A 10/1991 Divall et al.
5,065,910 A 11/1991 Fie
5,090,814 A 2/1992 Petcen
5,106,291 A 4/1992 Gellert
5,130,710 A 7/1992 Salazar
5,148,946 A 9/1992 Mizuta et al.
5,161,427 A 11/1992 Fukuda et al.
5,172,833 A 12/1992 Faulkner, III
5,176,803 A 1/1993 Barbuto et al.
5,177,901 A 1/1993 Smith
5,186,886 A 2/1993 Zerinvary et al.

(56) References Cited

U.S. PATENT DOCUMENTS

| | | | |
|---|---|---|---|
| RE34,197 | E | 3/1993 | Engel |
| 5,199,169 | A | 4/1993 | Bonzak |
| 5,217,154 | A | 6/1993 | Elwood et al. |
| 5,226,625 | A | 7/1993 | Hanna |
| 5,236,162 | A | 8/1993 | Desjardins |
| 5,261,610 | A | 11/1993 | Waryu et al. |
| 5,265,773 | A | 11/1993 | Harada |
| 5,287,762 | A | 2/1994 | Bonzak |
| 5,344,052 | A | 9/1994 | Divall et al. |
| 5,348,453 | A | 9/1994 | Baran et al. |
| 5,375,743 | A | 12/1994 | Soudan |
| 5,407,101 | A | 4/1995 | Hubbard |
| 5,452,824 | A | 9/1995 | Danek et al. |
| 5,480,487 | A | 1/1996 | Figini et al. |
| 5,535,919 | A | 7/1996 | Ganzer et al. |
| 5,553,742 | A | 9/1996 | Maruyama et al. |
| 5,564,606 | A | 10/1996 | Engel |
| 5,567,300 | A | 10/1996 | Datta et al. |
| 5,569,934 | A | 10/1996 | Fujii et al. |
| 5,624,045 | A | 4/1997 | Highsmith et al. |
| 5,637,815 | A | 6/1997 | Takahata et al. |
| 5,685,853 | A | 11/1997 | Bonnet |
| 5,699,934 | A | 12/1997 | Kolcun et al. |
| 5,765,730 | A | 6/1998 | Richter |
| 5,785,068 | A | 7/1998 | Sasaki et al. |
| 5,795,390 | A | 8/1998 | Cavallaro |
| 5,803,661 | A | 9/1998 | Lemelson |
| 5,814,022 | A | 9/1998 | Antanavich et al. |
| 5,819,983 | A | 10/1998 | White et al. |
| 5,823,747 | A | 10/1998 | Ciavarini et al. |
| 5,833,851 | A | 11/1998 | Adams et al. |
| 5,837,892 | A | 11/1998 | Cavallaro et al. |
| 5,886,494 | A | 3/1999 | Prentice et al. |
| 5,894,147 | A | 4/1999 | Cacharelis |
| 5,903,125 | A | 5/1999 | Prentice et al. |
| 5,904,377 | A | 5/1999 | Throup |
| 5,918,648 | A | 7/1999 | Carr et al. |
| 5,925,187 | A | 7/1999 | Freeman et al. |
| 5,927,560 | A | 7/1999 | Lewis et al. |
| 5,931,355 | A | 8/1999 | Jefferson |
| 5,947,022 | A | 9/1999 | Freeman et al. |
| 5,947,509 | A | 9/1999 | Ricks et al. |
| 5,957,343 | A | 9/1999 | Cavallaro |
| 5,964,378 | A | 10/1999 | Sperry et al. |
| 5,971,227 | A | 10/1999 | White et al. |
| 5,984,147 | A | 11/1999 | Van Ngo |
| 5,985,029 | A | 11/1999 | Purcell |
| 5,985,206 | A | 11/1999 | Zabala et al. |
| 5,985,216 | A | 11/1999 | Rens et al. |
| 5,988,530 | A | 11/1999 | Rockefeller |
| 5,992,688 | A | 11/1999 | Lewis et al. |
| 5,992,698 | A | 11/1999 | Copeland et al. |
| 5,992,704 | A | 11/1999 | Jager-Waldau |
| 5,993,183 | A | 11/1999 | Laskaris et al. |
| 5,993,518 | A | 11/1999 | Tateyama |
| 5,995,788 | A | 11/1999 | Baek |
| 6,007,631 | A | 12/1999 | Prentice et al. |
| 6,017,392 | A | 1/2000 | Cavallaro |
| 6,025,689 | A | 2/2000 | Prentice et al. |
| 6,068,202 | A | 5/2000 | Hynes et al. |
| 6,082,289 | A | 7/2000 | Cavallaro |
| 6,085,943 | A | 7/2000 | Cavallaro et al. |
| 6,088,892 | A | 7/2000 | Bertsch et al. |
| 6,093,251 | A | 7/2000 | Carr et al. |
| 6,112,588 | A | 9/2000 | Cavallaro et al. |
| 6,119,566 | A | 9/2000 | Yan et al. |
| 6,119,895 | A | 9/2000 | Fugere et al. |
| 6,123,167 | A | 9/2000 | Miller et al. |
| 6,126,039 | A | 10/2000 | Cline et al. |
| 6,132,396 | A | 10/2000 | Antanavich et al. |
| 6,157,157 | A | 12/2000 | Prentice et al. |
| 6,193,783 | B1 | 2/2001 | Sakamoto et al. |
| 6,196,477 | B1 | 3/2001 | Halltorp et al. |
| 6,196,521 | B1 | 3/2001 | Hynes et al. |
| 6,199,566 | B1 | 3/2001 | Gazewood |
| 6,206,964 | B1 | 3/2001 | Purcell et al. |
| 6,207,220 | B1 | 3/2001 | Doyle et al. |
| 6,214,117 | B1 | 4/2001 | Prentice et al. |
| 6,216,917 | B1 | 4/2001 | Crouch |
| 6,224,671 | B1 | 5/2001 | Cavallaro |
| 6,224,675 | B1 | 5/2001 | Prentice et al. |
| 6,234,358 | B1 | 5/2001 | Romine et al. |
| 6,234,858 | B1 | 5/2001 | Nix |
| 6,250,515 | B1 | 6/2001 | Newbold et al. |
| 6,253,957 | B1 | 7/2001 | Messerly et al. |
| 6,253,972 | B1 | 7/2001 | DeVito et al. |
| 6,257,444 | B1 | 7/2001 | Everett |
| 6,258,165 | B1 | 7/2001 | Cavallaro |
| 6,291,016 | B1 | 9/2001 | Donges et al. |
| 6,299,031 | B1 | 10/2001 | Cavallaro et al. |
| 6,299,078 | B1 | 10/2001 | Fugere |
| 6,311,740 | B1 | 11/2001 | Sperry et al. |
| 6,322,854 | B1 | 11/2001 | Purcell et al. |
| 6,324,973 | B2 | 12/2001 | Rossmeisl et al. |
| 6,354,471 | B2 | 3/2002 | Fujii |
| 6,371,339 | B1 | 4/2002 | White et al. |
| 6,378,737 | B1 | 4/2002 | Cavallaro et al. |
| 6,383,292 | B1 | 5/2002 | Brand et al. |
| 6,386,396 | B1 | 5/2002 | Strecker |
| 6,391,378 | B1 | 5/2002 | Carr et al. |
| 6,395,334 | B1 | 5/2002 | Prentice et al. |
| 6,412,328 | B1 | 7/2002 | Cavallaro et al. |
| 6,428,852 | B1 | 8/2002 | Pillion et al. |
| 6,450,416 | B1 | 9/2002 | Berg et al. |
| 6,453,810 | B1 | 9/2002 | Rossmeisl et al. |
| 6,511,301 | B1 | 1/2003 | Fugere |
| 6,514,569 | B1 | 2/2003 | Crouch |
| 6,540,832 | B2 | 4/2003 | Cavallaro |
| 6,541,063 | B1 | 4/2003 | Prentice et al. |
| 6,547,167 | B1 | 4/2003 | Fugere |
| 6,551,557 | B1 * | 4/2003 | Rose .................... B01L 3/0244 73/864.31 |
| 6,562,406 | B1 | 5/2003 | Chikahisa et al. |
| 6,581,906 | B2 | 6/2003 | Pott et al. |
| 6,609,902 | B1 | 8/2003 | Blais et al. |
| 6,619,198 | B2 | 9/2003 | Rossmeisl et al. |
| 6,626,097 | B2 | 9/2003 | Rossmeisl et al. |
| 6,644,517 | B2 | 11/2003 | Thiel et al. |
| 6,719,174 | B1 | 4/2004 | Swift |
| 6,729,507 | B2 | 5/2004 | Nagahata et al. |
| 6,736,900 | B2 | 5/2004 | Isogai et al. |
| 6,739,483 | B2 | 5/2004 | White et al. |
| 6,775,879 | B2 | 8/2004 | Bibeault et al. |
| 6,803,661 | B2 | 10/2004 | Thakar et al. |
| 6,828,167 | B2 | 12/2004 | Kim |
| 6,832,733 | B2 | 12/2004 | Engel |
| 6,851,923 | B1 | 2/2005 | Fugere |
| 6,866,881 | B2 | 3/2005 | Prentice et al. |
| 6,886,720 | B2 | 5/2005 | Penn |
| 6,892,959 | B1 | 5/2005 | Fugere |
| 6,896,202 | B1 | 5/2005 | Fugere |
| 6,957,783 | B1 | 10/2005 | Fugere |
| 6,981,664 | B1 | 1/2006 | Fugere |
| 6,983,867 | B1 | 1/2006 | Fugere |
| 6,994,234 | B2 | 2/2006 | De Leeuw |
| 7,000,853 | B2 | 2/2006 | Fugere |
| 7,018,477 | B2 | 3/2006 | Engel |
| 7,028,867 | B2 | 4/2006 | Acum et al. |
| 7,128,731 | B2 | 10/2006 | Aramata et al. |
| 7,176,746 | B1 | 2/2007 | Wang et al. |
| 7,178,745 | B1 | 2/2007 | Fugere |
| 7,190,891 | B2 | 3/2007 | Verrilli |
| 7,207,498 | B1 | 4/2007 | Fugere |
| 7,231,716 | B2 | 6/2007 | Verilli |
| 7,293,691 | B2 | 11/2007 | Rossmeisl et al. |
| 7,325,994 | B2 | 2/2008 | Liberatore |
| 7,331,482 | B1 | 2/2008 | Fugere |
| RE40,539 | E | 10/2008 | Fugere |
| 7,434,753 | B2 | 10/2008 | Verrilli |
| 7,448,857 | B1 | 11/2008 | Fugere |
| 7,614,529 | B2 | 11/2009 | Bolyard, Jr. et al. |
| 7,677,417 | B2 | 3/2010 | Leiner et al. |
| 7,694,857 | B1 | 4/2010 | Fugere |
| 7,744,022 | B1 | 6/2010 | Fugere |

(56) References Cited

U.S. PATENT DOCUMENTS

| | | | |
|---|---|---|---|
| 7,753,253 | B2 | 7/2010 | Terada et al. |
| 7,762,088 | B2 | 7/2010 | Fiske et al. |
| 7,762,480 | B1 | 7/2010 | Fugere |
| 7,874,456 | B2 | 1/2011 | Bolyard, Jr. et al. |
| 7,905,945 | B1 | 3/2011 | Fugere |
| 7,997,446 | B2 | 8/2011 | Engel |
| 8,056,833 | B1 | 11/2011 | Fugere |
| 8,152,428 | B2 | 4/2012 | Rowe et al. |
| 8,197,582 | B1 | 6/2012 | Fugere |
| 8,220,669 | B1 | 7/2012 | Fugere |
| 8,220,699 | B2 | 7/2012 | Dong et al. |
| 8,240,335 | B1 | 8/2012 | Broberg et al. |
| 8,281,963 | B2 | 10/2012 | Liu |
| 8,353,429 | B2 | 1/2013 | Zhou et al. |
| 8,448,818 | B2 | 5/2013 | Ikushima |
| 8,480,015 | B1 | 7/2013 | Fugere |
| 8,561,842 | B2 | 10/2013 | Pizzacalla et al. |
| 8,690,084 | B1 | 4/2014 | Fugere |
| 8,701,946 | B1 | 4/2014 | Fugere |
| 8,707,559 | B1 | 4/2014 | Fugere |
| 8,710,946 | B2 | 4/2014 | Pintgen et al. |
| 8,864,055 | B2 | 10/2014 | Fugere |
| 9,108,215 | B1 | 8/2015 | Fugere |
| 9,180,482 | B1 | 11/2015 | Fugere |
| 9,228,582 | B1 | 1/2016 | Fugere |
| 9,242,770 | B2 | 1/2016 | Fugere |
| 9,272,303 | B1 | 3/2016 | Fugere |
| 9,486,830 | B1 | 11/2016 | Fugere |
| 9,573,156 | B1 | 2/2017 | Fugere |
| 9,725,225 | B1 | 8/2017 | Fugere |
| 9,833,807 | B2 | 12/2017 | Fugere |
| 9,833,808 | B1 | 12/2017 | Fugere |
| 10,105,729 | B1 | 10/2018 | Fugere |
| 10,370,172 | B1 | 8/2019 | Fugere |
| 10,583,454 | B1 | 3/2020 | Fugere |
| 10,722,914 | B1 | 7/2020 | Fugere |
| 10,814,344 | B1 | 10/2020 | Fugere |
| 11,035,412 | B2 | 6/2021 | Risko Cattell et al. |
| 11,059,654 | B1 | 7/2021 | Fugere |
| 11,292,025 | B1 | 4/2022 | Fugere |
| 11,364,517 | B1 | 6/2022 | Fugere |
| 11,370,596 | B1 | 6/2022 | Fugere |
| 11,420,225 | B1 | 8/2022 | Fugere |
| 11,648,581 | B1 | 5/2023 | Fugere |
| 11,746,656 | B1 | 9/2023 | Fugere |
| 12,017,247 | B1 | 6/2024 | Fugere |
| 2001/0011506 | A1 | 8/2001 | Rossmeisl et al. |
| 2001/0020629 | A1 | 9/2001 | Fujii |
| 2001/0020787 | A1 | 9/2001 | Pott et al. |
| 2002/0007227 | A1 | 1/2002 | Prentice et al. |
| 2002/0007741 | A1 | 1/2002 | Rossmeisl et al. |
| 2002/0008118 | A1 | 1/2002 | Cavallaro |
| 2002/0020350 | A1 | 2/2002 | Prentice et al. |
| 2002/0084290 | A1 | 7/2002 | Materna |
| 2002/0088269 | A1 | 7/2002 | Cavallaro et al. |
| 2003/0000462 | A1 | 1/2003 | Prentice et al. |
| 2003/0038190 | A1 | 2/2003 | Newbold et al. |
| 2003/0066546 | A1 | 4/2003 | Bibeault et al. |
| 2003/0071149 | A1 | 4/2003 | Verilli |
| 2003/0084845 | A1 | 5/2003 | Prentice et al. |
| 2003/0091727 | A1 | 5/2003 | Prentice et al. |
| 2003/0097941 | A1 | 5/2003 | Rossmeisl et al. |
| 2003/0125671 | A1 | 7/2003 | Aramata et al. |
| 2003/0132243 | A1 | 7/2003 | Engel |
| 2003/0132443 | A1 | 7/2003 | Kim |
| 2003/0155384 | A1 | 8/2003 | Nagahata et al. |
| 2004/0089228 | A1 | 5/2004 | Prentice et al. |
| 2004/0140371 | A1 | 7/2004 | Engel |
| 2004/0142099 | A1 | 7/2004 | Rossmeisl et al. |
| 2004/0195278 | A1 | 10/2004 | De Leeuw |
| 2004/0245673 | A1 | 12/2004 | Allsop |
| 2004/0262824 | A1 | 12/2004 | Andersson et al. |
| 2005/0072815 | A1 | 4/2005 | Carew et al. |
| 2005/0095365 | A1 | 5/2005 | Acum et al. |
| 2005/0100457 | A1 | 5/2005 | Fugere |
| 2005/0103886 | A1 | 5/2005 | Verrilli |
| 2005/0135869 | A1 | 6/2005 | Liberatore |
| 2005/0158042 | A1 | 7/2005 | Verrilli |
| 2006/0037972 | A1 | 2/2006 | Leiner et al. |
| 2006/0157517 | A1 | 7/2006 | Fiske et al. |
| 2006/0278666 | A1 | 12/2006 | Wang et al. |
| 2007/0111400 | A1 | 5/2007 | Terada et al. |
| 2007/0145164 | A1 | 6/2007 | Ahmadi et al. |
| 2007/0267450 | A1 | 11/2007 | Bolyard, Jr. et al. |
| 2008/0273938 | A1 | 11/2008 | Rowe et al. |
| 2009/0095825 | A1 | 4/2009 | Ahmadi et al. |
| 2009/0266840 | A1 | 10/2009 | Brand et al. |
| 2010/0065306 | A1 | 3/2010 | Pintgen et al. |
| 2010/0276522 | A1 | 11/2010 | Fugere |
| 2010/0294810 | A1 | 11/2010 | Ikushima |
| 2011/0095056 | A1 | 4/2011 | Liu |
| 2011/0315906 | A1 | 12/2011 | Ohuchi et al. |
| 2012/0048888 | A1 | 3/2012 | Pizzacalla et al. |
| 2013/0105597 | A1 | 5/2013 | Dunlap et al. |
| 2014/0319402 | A1 | 10/2014 | Gatten |
| 2016/0082468 | A1 | 3/2016 | Fugere |
| 2020/0109746 | A1 | 4/2020 | Risko Cattell et al. |

OTHER PUBLICATIONS

"Material Dispense Tips and Methods for Manufacturing the Same" Specification, Drawings, Claims and Prosecution History of U.S. Appl. No. 12/034,313, filed Feb. 20, 2008, now U.S. Pat. No. 8,707,559, issued Apr. 29, 2014, by Jeffrey P. Fugere.

"Material Dispense Tips and Methods for Manufacturing the Same" Specification, Drawings, Claims and Prosecution History of U.S. Appl. No. 16/775,666, filed Jan. 29, 2020, now U.S. Pat. No. 11,292,025, issued Apr. 5, 2022, by Jeffrey P. Fugere.

"Method for Manufacturing a Material Dispense Tip" Specification, Drawings, Claims and Prosecution History of U.S. Appl. No. 14/217,809, filed Mar. 18, 2014, now U.S. Pat. No. 9,486,830, issued Nov. 8, 2016, by Jeffrey P. Fugere.

"Method for Manufacturing a Material Dispense Tip" Specification, Drawings, Claims and Prosecution History of United States U.S. Appl. No. 17/689,050, filed Mar. 8, 2022, now U.S. Pat. No. 11,648,581, issued May 16, 2023, by Jeffrey P. Fugere.

Karassik, et al., "Pump Hand Book" Second Ed., McGraw Hill Inc., 1986, p. 9.30.

Micro-Mechanics Design Specifications, May 1999.

Nordson EFD, "736HPA-NV High Pressure Dispense Valve Installation Guide", Jan. 2011.

Sela, Uri, et al., "Dispensing Technology: The Key to High-Quality, High-Speed, Die-Bonding", Microelectronics Manufacturing Technology, Feb. 1991.

Techon Systems, "Local Dispensing Solutions Worldwide: Dispensing Adhesives Material Can Be Challenging", downloaded from the internet on Nov. 4, 2011 (http://www.techconsystems.com/dispensing-adhesives).

Ulrich, Rene, "Epoxy Die Attach: The Challenge of Big Chips", Semiconductor International, Oct. 1994.

"Material Dispense Tips" Specification, Drawings, Claims and Prosecution History of U.S. Appl. No. 18/143,190, filed May 4, 2023, now U.S. Pat. No. 12,017,247, issued Jun. 25, 2024, by Jeffrey P. Fugere.

* cited by examiner

MATERIAL DISPENSE TIPS

RELATED APPLICATIONS

This application is a continuation application of U.S. patent application Ser. No. 18/143,190, filed May 4, 2023, now U.S. Pat. No. 12,017,247 issued on Jun. 25, 2024 which is a continuation of U.S. patent 5 application Ser. No. 17/689,050, filed Mar. 8, 2022, now U.S. Pat. No. 11,648,581, issued on May 16, 2023, which is a continuation application of U.S. patent application Ser. No. 16/775,666, filed Jan. 29, 2020, now U.S. Pat. No. 11,292,025, issued on Apr. 5, 2022, which is a continuation application of U.S. patent application Ser. No. 15/292,427, filed Oct. 13, 2016, now U.S. Pat. No. 10,583,454, 10 issued on Mar. 10, 2020, which is a continuation application of U.S. patent application Ser. No. 14/217,809, filed Mar. 18, 2014, now U.S. Pat. No. 9,486,830, issued on Nov. 8, 2016, which is a continuation application of U.S. patent application Ser. No. 12/034,313, filed on Feb. 20, 2008, now U.S. Pat. No. 8,707,559, issued on Apr. 29, 2014, which claims the benefit of U.S. Provisional Patent 15 Application No. 60/890,744 filed on Feb. 20, 2007, the contents of which are incorporated herein by reference in their entirety.

BACKGROUND OF THE INVENTION

A fluid dispense tip, also referred to as a "pin" or "needle," is utilized in a variety of applications. For example, a fluid dispense tip, when attached to a fluid dispense pump system, is used to deposit a precise amount of fluid material, such as glue, resin, or paste, at precise positions on a semiconductor substrate. Examples of such fluid dispense pumps are described in U.S. Pat. No. 6,511,301, U.S. patent application Ser. No. 10/948,850, filed Sep. 23, 2004, entitled "Fluid Pump and Cartridge," U.S. Pat. Nos. 6,892,959, 6,983,867, and U.S. patent application Ser. No. 10/810,236, filed Mar. 26, 2004, entitled "Dispense Pump with Heated Pump Housing and Heated Material Reservoir," the contents of each being incorporated herein by reference in their entirety.

The increase in integration density in semiconductor devices has led to the need for dispense needles to deposit fluid materials onto a substrate with higher precision, requiring fluid materials to be deposited in the form of dots having small diameters or lines having narrow widths, or other dispense patterns.

Several approaches are used to form a dispense tip that can dispense fluid material patterns, such as dots or lines. In one conventional approach, a neck of a dispense tip is formed by rolling a flat portion of machined metal into a cylindrical form and sealing the edges of the rolled, machined metal.

In another conventional approach, similar to that disclosed in U.S. patent application Publication Ser. No. 2003/0071149, the contents of which are incorporated by reference in their entirety, a dispense tip is formed by applying a conically-shaped mandrel against a malleable metallic disk and forcing the metal to be drawn down into a first cavity of a first die. The formed metal is removed from the first die. These steps are repeated using progressively smaller-diameter mandrels and progressively smaller-diameter circular dies until the finished dispense tip is formed.

In another approach, as disclosed in U.S. Pat. Nos. 6,547,167, 6,981,664, 6,957,783, the contents of which are incorporated herein by reference in their entirety, and as illustrated in FIG. 1, a body and a neck of a dispense tip are machined from a common stock, and a bore is drilled through the body and the neck, resulting in a bore in the neck having a relatively large constant first diameter that tapers down to an outlet having a relatively small second diameter.

In another approach, also disclosed in U.S. Pat. No. 6,547,167, the contents of which are incorporated herein by reference in their entirety, a dispense tip is molded or cast from materials such as plastics, composites, metals, or ceramics, other materials known to those of skill in the art as being used in the formation of a dispense tip.

As demands for dispensing precision continue to increase with the demand of further integration of devices, the above approaches have reached physical limits in their ability to provide dispense tips with outlets smaller than those achievable by the smallest available machining tools or die casts. This limits the ability to control dispensing operations of material at such fine dimensions and volumes.

SUMMARY OF THE INVENTION

The present invention is directed to dispense tips and methods of manufacturing the same, which overcome the limitations associated with the aforementioned approaches.

In accordance with an aspect of the invention, a method of forming an outlet hole in a material dispense tip suitable for low-volume material dispensing operations, the dispense tip having an elongated neck and an elongated hole in the neck extending from an input end of the neck to an output end of the neck, the hole at the output end of the neck having a first diameter comprises positioning the output end of the neck against a die surface; inserting a punch into the hole at the input end of the neck; and applying an external force to the neck to cause the output end of the neck to deform under compression by the die surface, to reduce the diameter of the hole at the output end of the neck from the first diameter to a second diameter that is less than the first diameter.

In an embodiment, the output end of the neck is positioned in an indentation of the die surface.

In an embodiment, the shape of the indentation is a V-shaped cone.

In an embodiment, the indentation is a female impression, and a diameter of a top portion of the female impression at the surface of the die is about 0.040 inches, and the depth of the female impression is about 0.020-0.040 inches.

In an embodiment, the shape of the indentation is parabolic.

In an embodiment, a geometry of the outlet hole is determined by the shape of the indentation.

In an embodiment, the neck is along a vertical axis, and wherein the external force is applied to the male punch in a downward direction along the vertical axis.

In an embodiment, the method further comprises forming an inlet hole from the input end of the neck to the outlet hole, the inlet hole having a third diameter that is greater than the first and second diameters at the output end of the neck.

In an embodiment, the method further comprises forming a taper between the inlet hole and the outlet hole that transitions that inlet hole having the third diameter to the second diameter of the outlet hole.

In an embodiment, a continuous fluid path is formed from the inlet hole at the input end of the neck to the outlet hole.

In accordance with another aspect, a dispense tip comprises an elongated neck; an elongated hole in the neck extending from an input end of the neck to an output end of the neck, the hole having a first diameter; and an outlet hole in a portion of the elongated hole at the output end of the neck, the outlet hole comprising a first end having the first diameter and second end that is deformed under compression such that an opening at the second end of the outlet hole has a second diameter that is less than the first diameter of the first end.

In an embodiment, the tip further comprises a first inner taper between the hole at the input end of the neck and the first end of the outlet hole.

In an embodiment, the outlet hole comprises a second inner taper between the first end of the outlet hole and the second end of the outlet hole. In an embodiment, the second inner taper is formed by positioning the output end of the neck against a die surface and applying an external force to the neck.

In an embodiment, the external force is a controlled force that is applied to a punch that is inserted into the input end of the neck.

In an embodiment, a base is coupled to the input end of the neck. In an embodiment, the base and the neck are unitary, and the base and the neck are formed from a single stock. In another embodiment, the base and the neck are independently formed, and coupled together by coupling the neck to the base. In an embodiment, the base comprises a LUER™-type coupling.

In accordance with another aspect, a method of forming a dispense tip comprises forming a neck having an input end and an output end on a longitudinal axis; forming a first hole in the neck centered along the longitudinal axis, the first hole having a first diameter from the input end of the neck to the output end of the neck; forming a second hole in the output end of the neck centered along the longitudinal axis, the second hole having a second diameter that is less than the first diameter; positioning the output end of the neck against a die surface; inserting a punch into the first hole of the neck; and forming an outlet hole from a portion of the second hole at the output end of the neck by applying an external force to the neck, the outlet hole comprising a first end having the second diameter and an opening at a second end having a third diameter that is smaller than the second diameter.

In an embodiment, the method comprises forming a first inner taper between the first hole and the second hole, the inner taper transitioning the first hole having the first diameter to the input end of the second hole having the second diameter.

In an embodiment, forming the outlet hole further comprises forming a second inner taper between the first end and the opening at the second end of the outlet hole.

In an embodiment, the second inner taper is formed by positioning the output end of the neck against a die surface and applying the external force to the dispense tip to reduce a diameter of the opening to the third diameter.

In an embodiment, the external force is a controlled force that is applied to a punch that is inserted into the first hole of the neck.

In an embodiment, the method comprises forming a first outer surface of the neck having a first outer diameter proximal to the input end of the neck and forming a second outer surface having a second outer diameter at the output end of the neck, and forming a first outer taper that transitions the first outer surface of the neck to the second outer surface of the neck.

In an embodiment, forming the first outer taper comprises beveling the neck along the longitudinal axis of the neck.

In an embodiment, the method comprises forming a second outer taper that transitions the second outer surface having the second outer diameter to a third outer surface proximal to the outlet, the third outer surface having a third outer diameter.

In an embodiment, the second outer taper is formed by positioning the tip of the output end of the neck against a die surface and applying an external force to the dispense tip.

In accordance with another aspect, a dispense tip comprises an outlet hole in a material dispense tip suitable for low-volume material dispensing operations, the dispense tip having an elongated neck and an elongated hole in the neck extending from an input end of the neck to an output end of the neck, the hole at the output end of the neck having a first diameter, and the outlet hole is formed according to a process including: positioning the output end of the neck against a die surface; inserting a punch into the hole at the input end of the neck; and applying an external force to the neck to cause the output end of the neck to be deformed under compression by the female die surface, to reduce the diameter of the hole at the output end of the neck from the first diameter to a second diameter that is less than the first diameter.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS OF THE INVENTION

Figure 1:
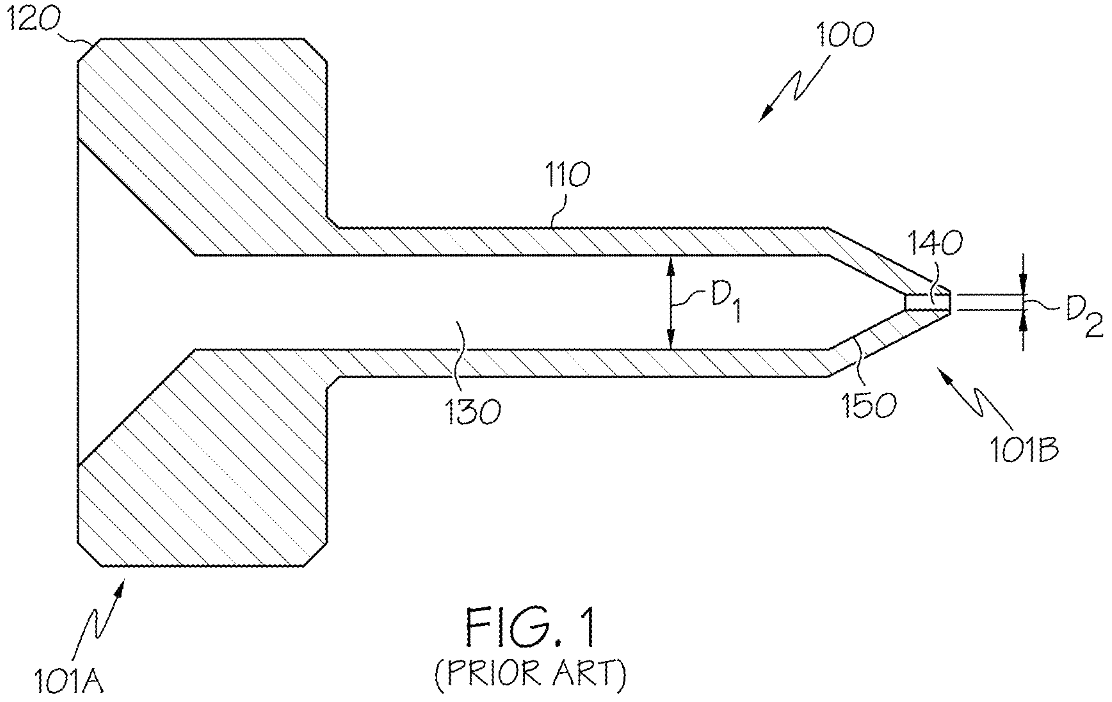
FIG. 1 (PRIOR ART)
FIG. 1 is an illustrative cross-sectional view of a machined dispense tip having a reduced-diameter outlet that is less than the inner diameter of a primary neck bore.

The accompanying drawings are described below, in which example embodiments in accordance with the present invention are shown. Specific structural and functional details disclosed herein are merely representative. This invention may be embodied in many alternate forms and should not be construed as limited to example embodiments set forth herein.

Accordingly, specific embodiments are shown by way of example in the drawings. It should be understood, however, that there is no intent to limit the invention to the particular forms disclosed, but on the contrary, the invention is to cover all modifications, equivalents, and alternatives falling within the spirit and scope of the claims.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "on," "connected to" or "coupled to" another element, it can be directly on, connected to or coupled to the other element or intervening elements may be present. In contrast, when an element is referred to as being "directly on," "directly connected to" or "directly coupled to" another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise.

FIG. 1 is an illustrative cross-sectional view of a machined dispense tip 100 having a reduced-diameter outlet 140 that is less than the inner diameter of a primary neck hole 130, in accordance with those described in U.S. Pat. No. 6,547,167, incorporated by reference above.

Referring to FIG. 1, the neck hole 130 is formed in a neck 110 and body 120 of the dispense tip 100. The neck hole 130 has an inner diameter $D_1$. The outlet hole 140 is formed in the neck 110 at an outlet end of the neck 110. The outlet hole 140 has an inner diameter $D_2$ that is significantly smaller than the inner diameter $D_1$ of the neck hole 130. An inner taper 150 transitions the neck hole 130 having the inner diameter $D_1$ to the outlet hole 140 having the smaller inner diameter $D_2$.

In forming the dispense tip 100, a primary neck hole 130 is machined, drilled, or otherwise formed through a proximal end 101A of the dispense tip 100, and through the body 120 and neck 110, resulting in a neck hole 130 having an inner diameter $D_1$. In one embodiment, the inner diameter D1 is substantially constant along the length of the neck hole 130. In another embodiment, the neck hole 130 comprises a taper or draft from the input end of the neck hole 130 to the outlet hole 140, such that a diameter at an input end of the neck hole 130 is greater than a diameter at an output end of the neck hole 130 proximal to the outlet hole 140. In another embodiment, the neck hole 130 comprises a taper or draft from the input end of the neck hole 130 to the inner taper 150, such that a diameter at an input end of the neck hole 130 is greater than a diameter at the opposite side of the neck hole 130 near the inner taper 150.

The outlet hole 140 is formed by machining, drilling, or otherwise forming an outlet bore through a distal end 101B of the dispense tip 100, for example, using a drill bit having a smaller inner diameter than the drill bit used to form the primary neck hole 130. The resulting wider neck bore diameter $D_1$ along the majority of the neck 110 allows for delivery of fluid to the relatively narrow inner diameter $D_2$ opening at a relatively low pressure that is more desirable for volume control, while the relatively small outlet hole 140 allows for control over the volume and width of the dispensed fluid on the substrate.

However, the respective diameters $D_2$, $D_1$ of the outlet hole 140 and neck hole 130 are dependent on the outer diameter of the drill bits used to form the outlet hole 140 and neck hole 130. The dispense tip 100 illustrated in FIG. 1 is therefore limited to an outlet bore diameter $D_2$ on the order of approximately 0.004 inches or more, since drilling at diameters less than this approaches the limits of what is possible using conventional tooling, or limited to diameters permitted by conventional molding techniques. The diameter of a dispensed dot pattern depends largely on the diameter of the outlet hole 140. For example, an outlet hole diameter of 0.004 inches may result in a dispensed dot pattern having a diameter of approximately 0.006 inches. However, such a dot pattern diameter may be too large for certain modern applications. For example, as the trend of further circuit integration continues, the area of circuit components decreases, while pin count increases; thus, there is an increasing need for precise patterns, such as dot patterns, to be dispensed having very small diameters and volumes, but without sacrificing the accuracy and reliability of such dispensing operations.

Figure 2A:
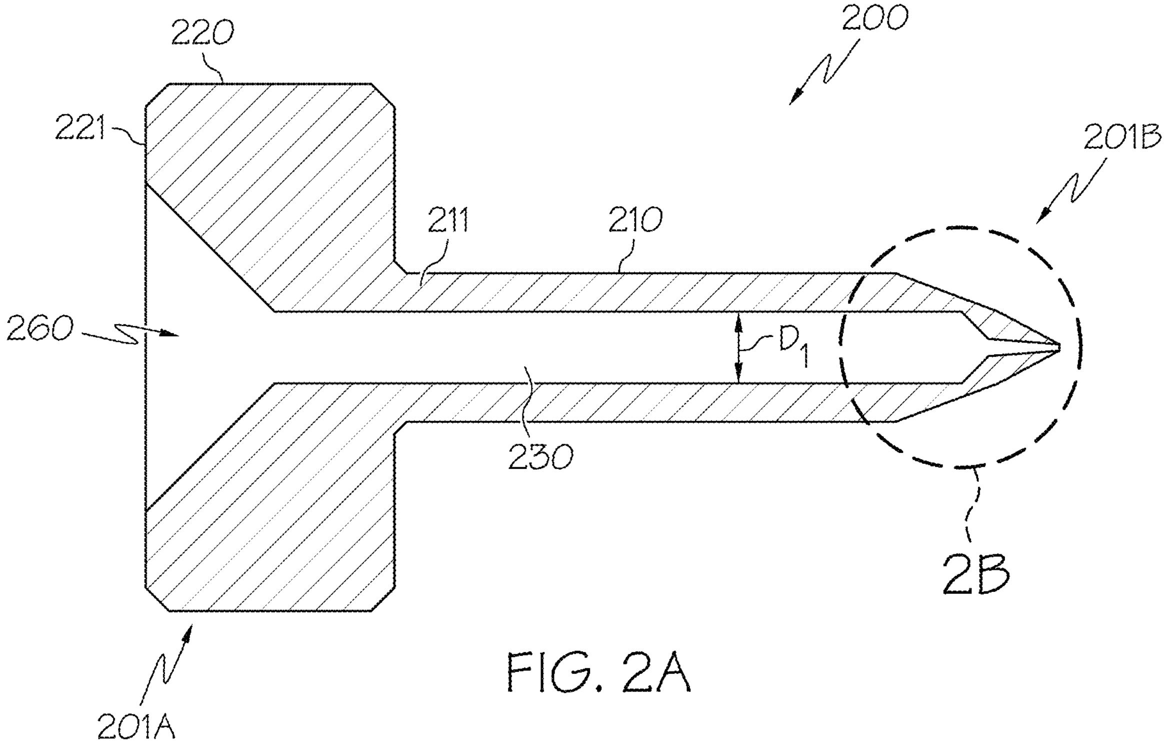
FIG. 2A is an illustrative cross-sectional view of a dispense tip in accordance with an embodiment of the present invention.
Figure 2B:
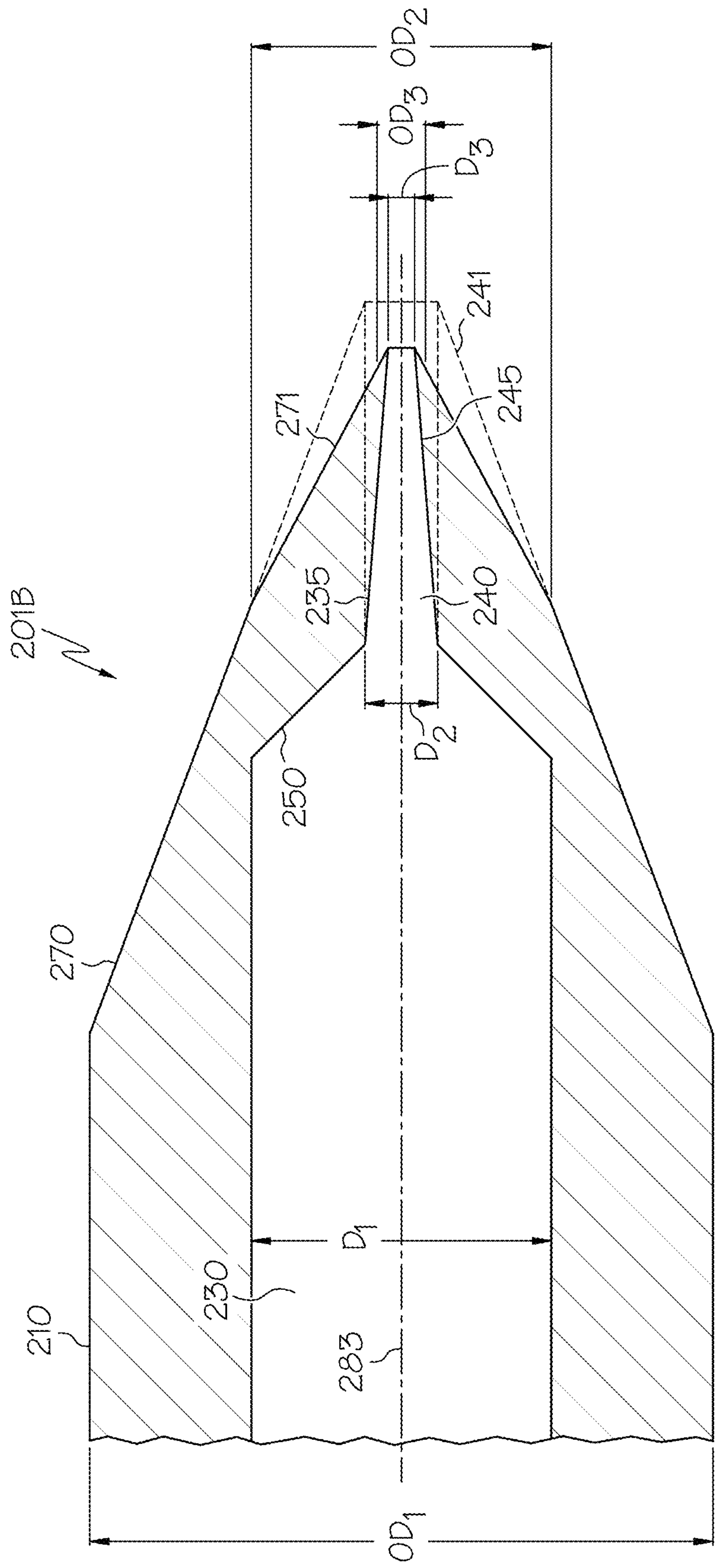
FIG. 2B is an enlarged partial cross-sectional view of an outlet hole region of the dispense tip neck of FIG. 2A.

FIG. 2A is an illustrative cross-sectional view of a dispense tip 200 in accordance with an embodiment of the present invention. FIG. 2B is an enlarged partial cross-sectional view of an outlet hole region 201B of the dispense tip neck 210 of FIG. 2A.

In the embodiment of FIGS. 2A-2B, the dispense tip 200 comprises a neck 210 and a body or base 220. In one embodiment, the body 220 and neck 210 of the dispense tip 200 can be machined from a common stock, as shown in FIG. 2A. Such unitary construction provides a dispense tip that is of enhanced strength and rigidity, and therefore leads to more accurate and consistent dispensing, as well as greater longevity. The neck 210 and body 220 can be formed of a workable, machinable material such as stainless steel, for example, 303 stainless, or metals such as copper, brass, aluminum, or other metals, or alloys thereof, known to one or ordinary skill as possessing machining properties necessary to form a machined dispense tip. The neck 210 and body 220 can be also machined, molded, or otherwise formed from any number of applicable materials, including ceramics, composites, and plastics, or other materials known to one of ordinary skill as possessing machining or molding properties necessary to form a machined or molded dispense tip. Alternatively, as shown in FIG. 6, the neck 210 can be formed separately from the body 220, and later joined to the body 220, in which case the body 220 and neck 210 can be coupled together via press-fitting, bonding, or welding, or other applicable techniques. In other embodiments, the neck 210 or body 220 of the dispense tip 200 can be formed in accordance with methods similar to those disclosed in U.S. Pat. No. 6,547,167, incorporated by reference above. In other embodiments, the materials used to form the neck 210 and body 220 can be heated to reduce the hardness properties of the materials, or to improve the malleability of the materials, or to otherwise improve other properties of the materials to permit the methods described herein to be applied to the materials used to form the neck 210 and body 220.

The rear face 221 of the body 220 of the dispense tip 200 is configured to be mounted to a material dispense pump (not shown), whereby the pump transports materials for dispensing, such as viscous fluids, to the dispense tip 200. The body 220 is typically secured to a dispense pump by a nut, but other configurations for securing are possible. The dispense tip 200 can be used in conjunction with any number of different dispense pumps and related systems; such pumps being of the type disclosed in U.S. Pat. Nos. 6,511,301, 6,892,959, 6,983,867, and 7,331,482, the contents of each being incorporated herein by reference.

During a dispensing operation, material is dispensed from the material dispense pump into a proximal end, or input end 201A, of the dispense tip 200 through the body 220 and neck 210, where it is transferred through a neck hole or bore 230, and output through an opening at an output end 245 of an outlet hole 240 at the distal end of the neck 210. The opening at the output end 245 of the outlet hole 240 has a very small inner diameter $D_3$ that permits dot or line patterns to be accurately dispensed onto a substrate at geometries at an order of magnitude smaller than those obtainable by conventional means, for example, on the order of less than 0.001-0.003 inches in diameter or width. The type of pattern dispensed from the pump and dispense tip 200 depends on the application. For example, dots of material can be dispensed for applications that require precise discrete placement of small volumes of material, and lines of material can be dispensed for other applications, such as small-scale underfill or encapsulation.

The outlet hole 240 of an inner diameter $D_2$ is formed at a distal end, or outlet hole region 201B, and communicates with the neck hole 230 through the neck 210. In one embodiment, a small drill bit is used to machine an outlet hole or bore, for example, a conventional drill bit having an outer diameter ranging from at least 0.004 to 0.010 inches. Assuming this, the inner diameter $D_2$ of the outlet hole likewise has a range from at least 0.004 to 0.010 inches. In another embodiment, the neck hole 230 includes the outlet hole, such that the dispense tip 200 includes a taper or draft between an input end of the neck hole 230 proximal to a funnel 260 (described below) and an output end of the outlet hole, the taper or draft being formed during formation of the dispense tip, for example, by a molding process.

In an embodiment, the outlet hole 240 initially has an inner diameter $D_2$ that is generally the same at both an input end 235 of the outlet hole 240 and at an opening at the output end 245 of the outlet hole 240. This initial configuration of the outlet hole 240 of uniform inner diameter $D_2$ is represented in FIG. 2B by dashed lines 241. In accordance with the embodiments of the present invention, the opening at the output end 245 of the outlet hole 240 undergoes a reduction process whereby the initial inner diameter $D_2$ at the opening at the output end 245 of the outlet hole 240 is reduced to a reduced inner diameter $D_3$. This reduction can occur, for example, according to the embodiments described below in connection with FIGS. 3A-3C. As a result of the reduction, the outlet hole 240, initially having a substantially cylindrical inner surface, will have a tapered inner surface 251, the tapered inner surface 251 transitioning from the input end 235 of the outlet hole 240 having substantially the initial inner diameter $D_2$ to the output end 245 having the reduced inner diameter $D_3$. Although the interior cross-sectional surfaces of the outlet hole 240 are referred to as having "diameters," such cross-sections are not necessarily a perfect circle, especially following the reduction process; thus, the term "diameter," when referring to the "initial" and "reduced" inner diameters $D_2$, $D_3$ of the outlet hole 240 can include other, non-circular, cross-sectional shapes, in which case, the term "diameter" can also refer to "widths" of those cross-sectional shapes.

The resulting tapered inner surface 251 of the outlet hole 240 can be considered to have a conical shape or parabolic shape as a result of the reduction process; however, other inner surface shapes are equally applicable to the embodiments of the present invention. In one example embodiment, the inner diameter $D_2$ of the input end 235 of the outlet hole 240 is approximately 0.006 inches and the reduced inner diameter $D_3$ of the output end 245 of the outlet hole 240 is approximately 0.003 inches, and the distance between the input end 235 and the output end 245 is approximately 0.025 inches. This results in a reduction in diameter of 0.003 inches over a distance of 0.025 inches, which roughly amounts to the tapered inner surface 251 of the outlet hole 240 having an angle of about 3.5 degrees relative to the longitudinal axis 283 of the outlet hole 240. However, other taper angles are equally applicable to embodiments of the present invention, depending on the application. The outlet hole 240 is distinguished from the dispense tip outlet hole of the example dispense tip illustrated at FIG. 1, which has a single, constant, diameter $D_2$ over the length of the outlet hole region. The tapered outlet hole 240 illustrated in FIG. 2 is contributive to superior material flow at relatively low pressure, as compared to conventional tips, resulting in reduced clogging with enhanced volume control, due in part to the reduced inner diameter $D_3$ of the output end 245 of the outlet hole. In addition, pressure reduction for dispensing is also enhanced, with improved flow characteristics due to the gradual reduction of the inner diameter from the input end 235 of the outlet hole 240 to the output end 245, which, as discussed above, can further enhance dispensing precision.

The neck hole 230 is formed through the body 220 and through the input end 211 of the neck 210 along a longitudinal axis of the neck 210 to the outlet hole region 201B of the neck 210. The neck hole 230 has an inner diameter $D_1$ that is greater than the diameter $D_2$ at the input end 235 of the outlet hole 240. In one example, the inner diameter $D_1$ of the neck hole 230 is about 0.025 inches. A first inner taper 250 transitions the inner diameter $D_1$ of the neck hole 230 to the inner diameter $D_2$ at the input end 235 of the outlet hole 240. In certain embodiments, the first inner taper 250 has a surface that is generally conical or parabolic in shape and lies at an angle of about 30 degrees relative to a longitudinal axis 283 of the neck hole 230. However, other taper angles are equally applicable to the embodiments of the present invention, depending on the application. In a case where the neck hole 230 and first inner taper 250 are formed by drilling, the inner surface of the first inner taper 250 conforms to the outer surface of the end of the drill bit.

A funnel 260 can be optionally formed in the rear face 221 of the body 220 through a portion of the body 220, and finished in the body 220 at a funnel angle, for example, on the order of 45 degrees relative to the longitudinal axis 283 of the neck hole. Other funnel angles are equally applicable to embodiments of the present invention, depending on the application. The funnel 260 includes an inlet proximal to the rear face 221, and communicates with an outlet of a material dispense pump (not shown) at the rear face 221. The funnel 260 further includes an outlet that communicates with the neck hole 230. In this manner, a continuous fluid path is formed from the funnel 260 of the body 220 at an input end 201A of the dispense tip 200 to the outlet hole opening at the outlet hole region 201B of the dispense tip.

In other embodiments, as disclosed in U.S. Pat. No. 6,547,167, incorporated by reference above, the funnel 260 includes a plurality of outlets, and the dispense tip includes a like plurality of necks, each outlet communicating with a corresponding neck of the plurality of necks, wherein a single fluid path is provided between each outlet of the funnel and the output end of each neck.

The outlet hole region 201B of the neck 210 has a first outer taper or bevel 270 at the outlet hole region 201B, which, in some embodiments, can also correspond with a region of the first inner taper 250. In one embodiment, the neck 210 can be configured to have a first outer diameter $OD_1$ along a majority of the length of the neck 210 that is reduced to a second outer diameter $OD_2$ in a region of the outlet hole 240 by the first outer taper 270. In one embodiment, the first outer taper 270 comprises a bevel that is formed by grinding the neck 210 along the longitudinal axis of the neck using a grinding wheel, for example, in accordance with formation techniques disclosed in U.S. Pat. No. 6,896,202, the contents of which are incorporated herein by reference in their entirety. In this manner, the bevel includes longitudinal scars that are parallel to the longitudinal axis of the dispense tip neck 210.

As a result of the reduction process of the inner diameter $D_3$ of the outlet hole 240, according to the embodiments disclosed herein, the neck 210 can further include a second outer taper or bevel 271 at the distal end of the neck 210 that transitions the outer surface having the second outer diameter $OD_2$, for example, in the region of the body of the outlet hole 240, to an outer surface having a third outer diameter $OD_3$ that is in a region of the neck proximal to the opening at the output end 245. The second outer taper 271 results in the output end 245 of the outlet hole 240 having an even further reduced surface tension, leading to a higher degree of dispensing precision capability. In another embodiment, the second outer taper 271 includes longitudinal scars that are parallel to the longitudinal axis of the dispense tip neck 210. The longitudinal scars can be formed by grinding the neck 210 along the longitudinal axis of the neck 210 prior to forming the second outer taper 271.

Figure 3A:
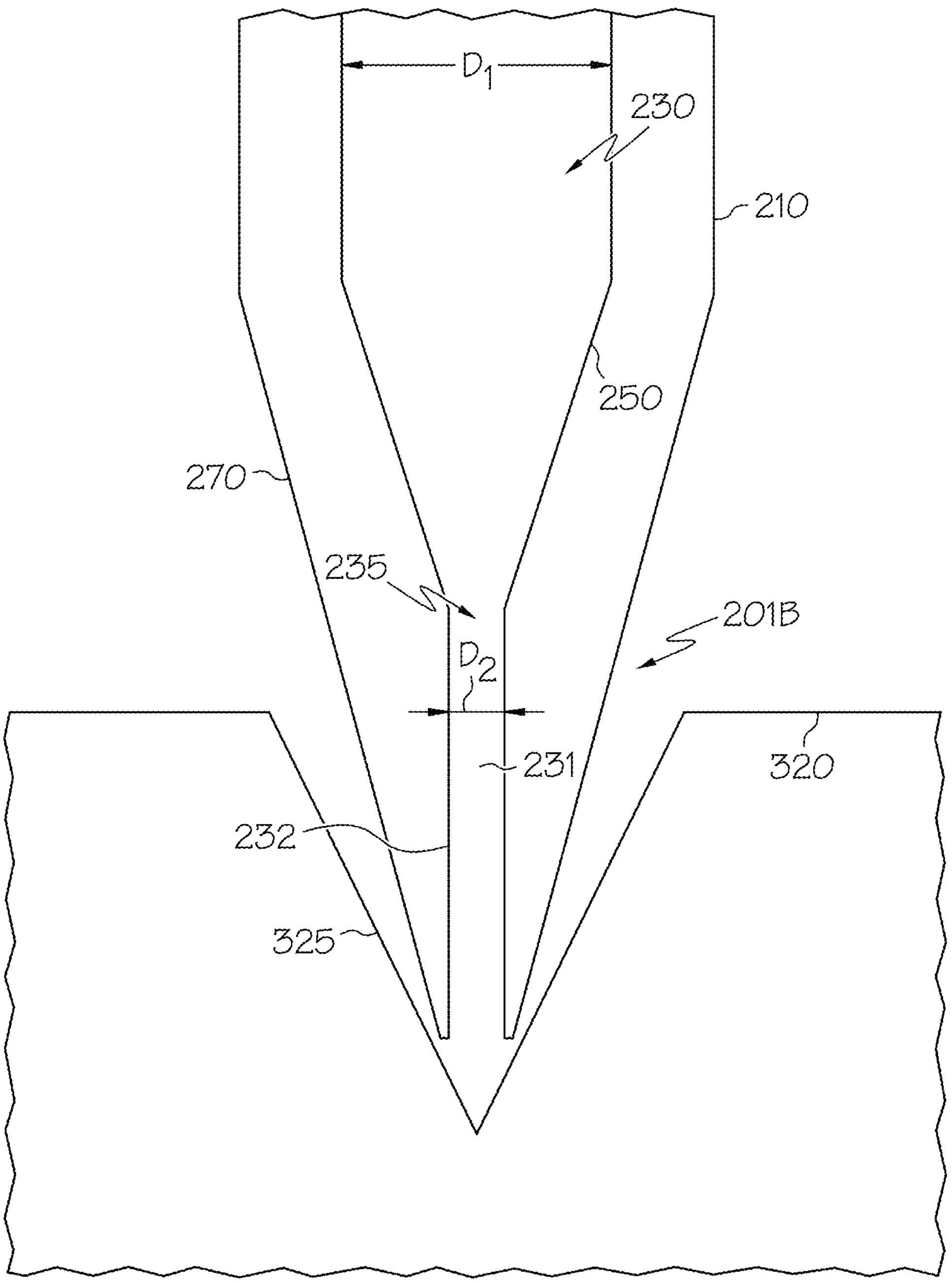
FIGS. 3A-3C are cross-sectional views illustrating sequential steps of forming an outlet hole in the dispense tip of FIGS. 2A-2B, in accordance with embodiments of the present invention.
Figure 3B:
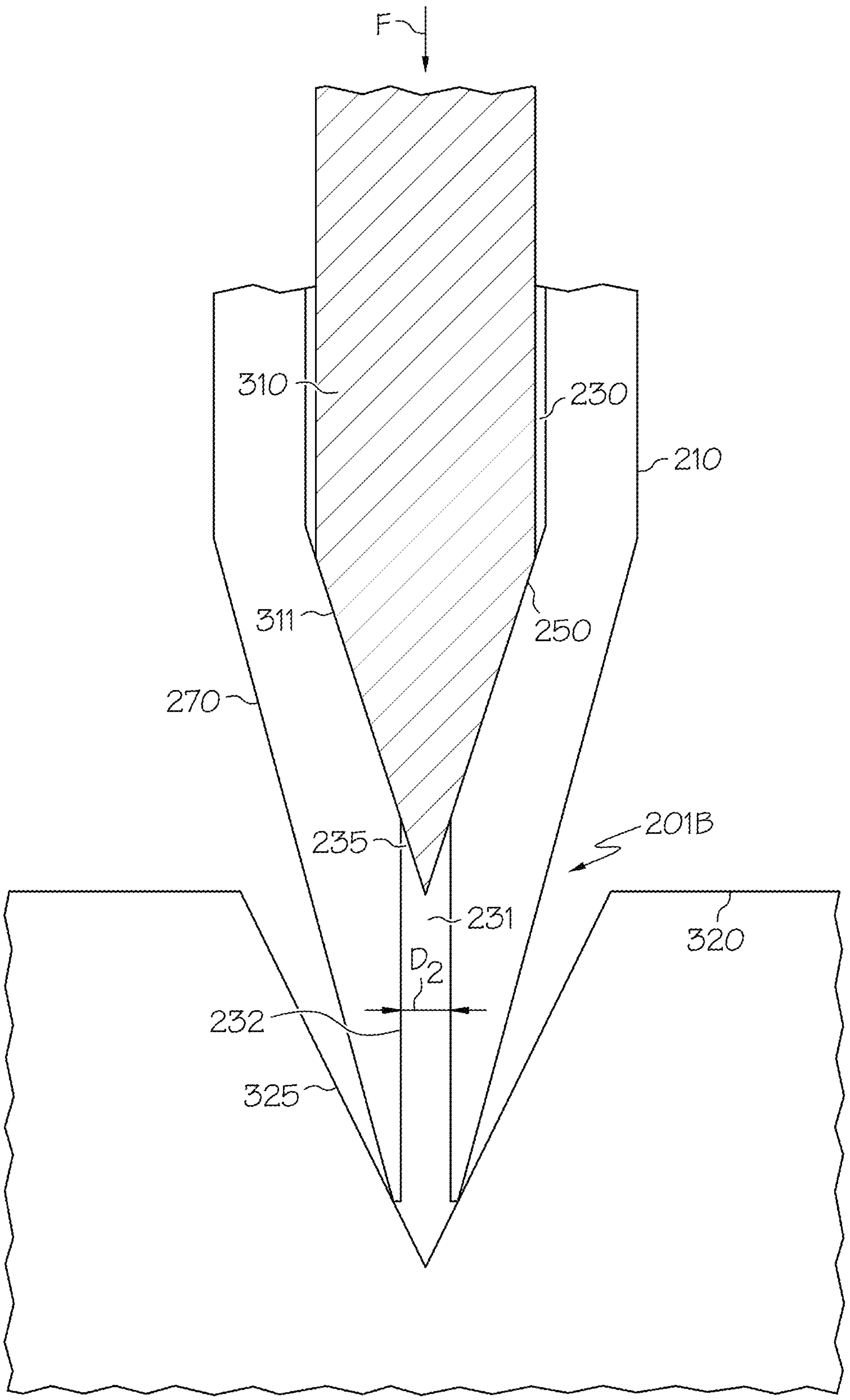
Figure 3C:
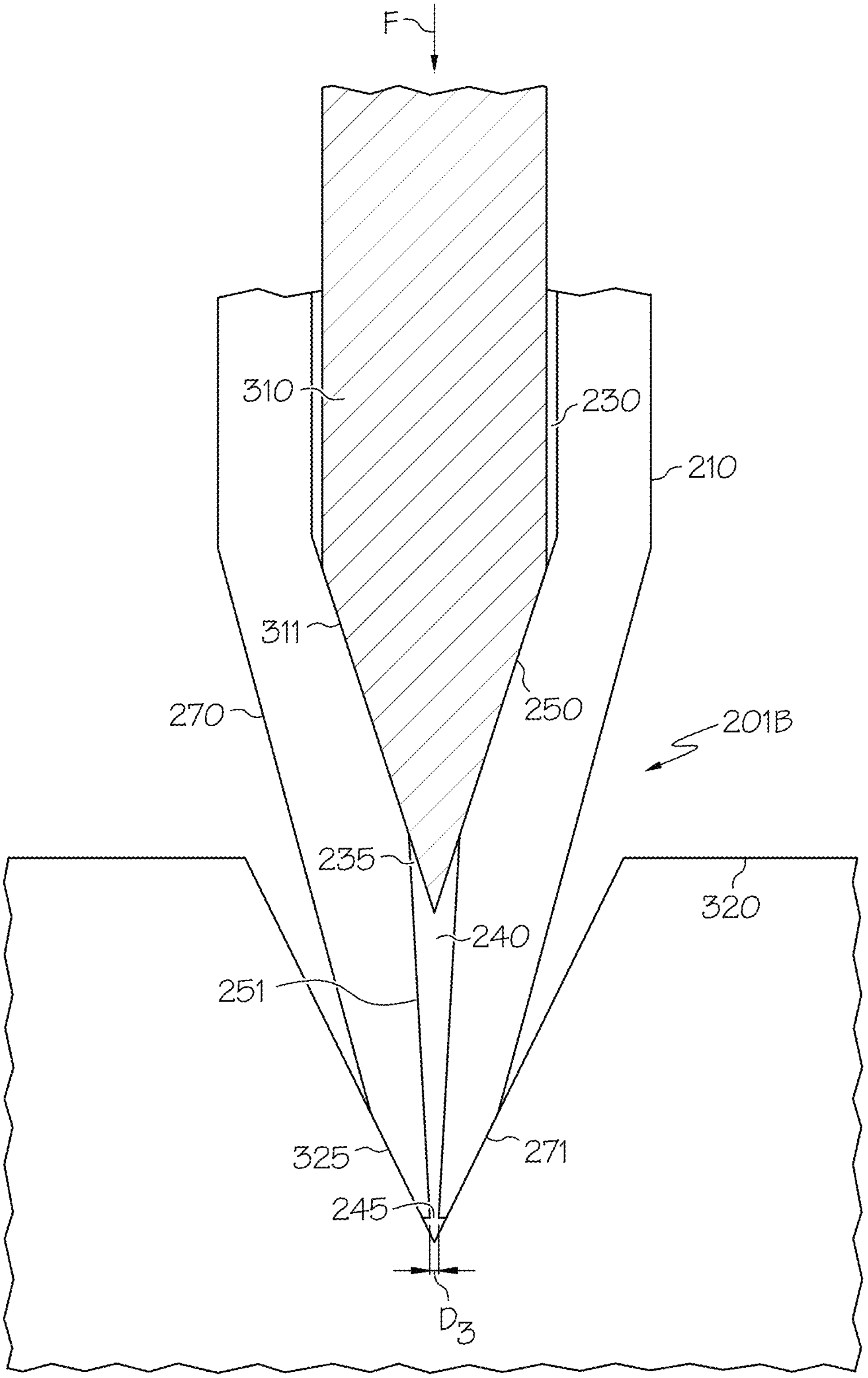

FIGS. 3A-3C are cross-sectional views illustrating sequential steps of forming an outlet hole in the dispense tip of FIGS. 2A-2B, in accordance with embodiments of the present invention. In one embodiment, as illustrated at FIGS. 3A-3C, a male punch 310 and female die 320 are used to form a reduced-diameter outlet hole 240.

As shown in FIG. 3A, the outlet hole region 201B of the neck 210 is inserted into a female indentation or impression 325 formed in the female die 320. The inner surface of the female impression 325 can be polished, to avoid formation of tool scars on the outer taper 271 during the reduction process. The neck 210 is preferably positioned along a vertical axis relative to the female die 320, but can also be positioned at an acute angle relative to the vertical axis.

In one embodiment, the die 320 is composed of a material, for example, carbide or other tool steel, having hardness properties that are greater than the material used for forming the dispense tip neck 210.

The female impression 325, in one embodiment, is in the shape of a cone, wherein the wall of the female impression 325 is tapered inwardly toward a point at the bottom of the impression 325. In other embodiments, the female impression 325 can be of any concave shape, such as a parabolic shape, that would result in reduction of the inner diameter $D_3$ of the opening at the output end 245 of the outlet hole 240. In one embodiment, the diameter of a top portion of the impression 325 at the surface of the die 320 is about 0.040 inches, and the depth of the female impression 325 is about 0.020-0.040 inches. However, the female impression 325 can have dimensions that vary from those described herein so long as a dispense tip can be received by the female impression 325, and so long as the tip can be formed or modified by interaction with the female impression 325 to have at least one of an second inner taper 251, an opening at the output end 245 having an inner diameter $D_3$ smaller than an inner diameter $D_2$ at an input end 235 of the outlet hole, and a second outer taper 271.

As shown in FIG. 3B, an elongated male punch 310 is inserted into the neck hole 230 through the body 220 and the neck 210 until it abuts the input end of the hole 235 and the first inner taper 250. The dispense tip 200 and inserted punch 310 are placed in position on a machine, such as a bridge port drill press, between the machine and the die 320, and the machine is incrementally made to bear down on the punch 310, which, in turn, bears down on the first inner taper 250 of the dispense tip 200. At this time, prior to application of further pressure on the dispense tip, to initiate the reduction process, the dispense tip, when induced by an operator, may turn freely about the punch 310. As the distance between the machine and die 320 is incrementally reduced, at a certain point, the dispense tip 200 will no longer turn freely about the punch 310. This point can be used as a gauge to determine where to initiate the reduction process. During the reduction process, the dispense tip 200 is in a substantially static position, as its inner taper 250 is under continuous pressure from the punch 310.

In one embodiment, the punch 310, like the dispense tip 200, is positioned in a substantially vertical position relative to the female die 320. In another embodiment, the punch 310 and the dispense tip 200 are positioned in a different position, such as a substantially horizontal position. The punch 310 has an outer diameter that is slightly less than the inner diameter $D_1$ of the neck hole 230, for example, 0.025 inches. The punch 310, like the die 320, can be formed of a material having a hardness that is greater than the material used to form the dispense tip 200, for example, carbide or other tool steel. The punch 310 can include a tapered distal end 311 that closely coincides with the first inner taper 250 of the neck 210. For example, the outer surface of the tapered distal end of the punch 310 lies at an angle relative to the longitudinal axis of the punch 310 that is similar to the angle of the first inner taper 250 of the neck 250, for example, 30 degrees relative to the longitudinal axis of the neck 210.

In one embodiment, a controlled external force F is applied to the punch 310 oriented in a direction toward the die 320. In other embodiments, an external force is applied to the base 220 or neck 210 of the tip 200. As shown in FIG. 3B, the external force is preferably a controlled downward vertical force F that is applied by the punch 310 to the dispense tip 200 at the first inner taper 250.

The source of the controlled external force F can be a machine known to those of ordinary skill in the art, for example, a milling machine or a bridge port drill press. In another embodiment, the machine can apply a force F that is sufficient to move the male punch 310 toward the female die 320 in increments, for example, a machine capable of providing a force to the neck 210, by incrementally moving the punch 310 in a direction toward the die 320 in 0.001 inch increments. After each incremental change in position, the male punch 310 can be removed from the neck 310 and measurements can be taken of the reduced outlet hole, for example, the inner diameter $D_2$ of the input end 235, the reduced inner diameter $D_3$ of the output end 245, the distance between the input end 235 and the output end 245, and the tapered inner surface 251 angle relative to the longitudinal axis 283 of the outlet hole 240.

The exertion of force applied against the first inner taper 250 of the dispense tip results in the compression of the outlet hole region 201B of the neck 210 by the surface of the impression 325 of the die 320, which incrementally decreases in inner diameter along its length. The presence of the outer bevel 270 at the output end 201B of the neck 210 enhances the compression process, since the bevel 270 reduces the wall thickness of the neck 210 in this region. In addition, the punch 310 is configured to avoid substantial penetration into the outlet hole 240 during the reduction procedure so that it does not interfere with inward compression of the inner walls of the outlet hole 240 during the procedure. The amount of vertical force F being applied can be determined manually, or the amount of force F can be controlled by using a computer in communication with a machine, such as a pneumatic machine. As a result, as shown in FIG. 3C, the outside surface of the outlet hole region 201B of the neck 210 substantially conforms to the polished tapered walls of the impression 325. As a result of the external force being applied to the first inner taper 250, as shown in FIG. 3C, the outlet hole region 201B of the neck 210 is pressed against the polished surface of the impression 325, which causes the outlet hole 231 to change shape as it undergoes deformation. Specifically, the shape of the impression 325 and the force of the punch 310 being applied to the first inner taper 250 cause the outlet hole 240 to have an output end 245 of a reduced inner diameter $D_3$ as the outlet hole region 201B becomes further pressed into the die 320. As described above, in one embodiment, this results in the outlet hole 240 having an input end 235 of substantially the second inner diameter $D_2$ of the original outlet hole, and has an output end 245 of the reduced, formed third inner diameter $D_3$. The tapered inner surface 251 of the outlet hole 240 is formed between the input end 235 and the output end 245 as a result of the inner walls 232 at a portion of the outlet hole 240 being compressed inwardly. Other regions of the dispense tip 200, for example, the neck hole 230, do not experience any change in shape as a result of the outlet hole reduction.

As a result of forming the reduced-diameter outlet hole 240, the output end 245 of the outlet hole 240 can have a sharpened point. In one embodiment, the sharpened point can be removed by grinding or machining the sharpened point, thereby forming a small flat surface at the output end 245, while retaining an outlet hole 240 having a reduced inner diameter $D_3$ and a wall thickness at the end of about 0.001 inches. Removing the sharpened point in this manner protects the dispense tip from damage, and ensures the accuracy and reliability of the dispense tip, during dispensing operations.

In one embodiment, the neck 210 remains stationary while the external force is applied to the neck 210 by the punch 310. In another embodiment, the neck 210 can be rotated about a vertical axis while the external force is applied to the punch 310. During rotation, the punch 310 can be forced downward along the vertical axis toward the female impression 325.

A dispense tip outlet hole 240 can therefore be formed having an opening that has a smaller inner diameter than dispense tips machined according to conventional procedures, for example, on the order of less than 0.004 inches, which is less than the diameter achievable by conventional formation. This corresponds to a resulting dot diameter or line width of less than 0.006 inches, which is less than dot diameters or line widths currently achievable.

As a result of the outlet hole reduction, when the outlet hole region 201B of the neck 210 is pressed into the surface of the die impression 325, a second outer taper 271 can be formed at the outlet hole region 201B of the neck 210 having a greater angle relative to the longitudinal axis 283 of the outlet hole 240 than the first outer taper 270.

In one embodiment, prior to forming the second outer taper 271, the neck 210 can be beveled, for example, in accordance to the method illustrated at U.S. Pat. No. 6,896,202, incorporated by reference above. After the bevel is formed, the beveled neck can be polished using a polishing compound, for example, Jeweler's rouge. In another embodiment, after the outlet hole 240 reduction process is performed, the outlet hole region 201B can be polished using a polishing compound, for example, Jeweler's rouge.

The fabrication methods illustrated in FIGS. 3A-3C can be applied to a machined dispense tip, for example, the dispense tip illustrated at U.S. Pat. No. 6,547,167, incorporated by reference above, or a molded dispense tip, for example, a ceramic dispense tip. Although the above examples describe initial formation of the outlet hole 240 using drill bits or machining tools of the smallest outer diameters available, for example, on the order of 0.004 inches, in other embodiments, the outlet hole 240 can be initially formed to much larger inner diameters, for example, on the order of 0.010 inches, or greater, for example, using larger-diameter drill bits. The resulting outlet hole 240 can then be reduced in inner diameter at its output end according to the aforementioned process. For example, the resulting 0.010 inch inner diameter outlet hole 240 can be reduced to 0.006 inches in inner diameter at its output end 245. The resulting dispense tip having an outlet hole 240 that tapers in inner diameter from 0.010 inches at its input end 235 to 0.006 inches at its output end 235 would offer improved material flow characteristics, reduced pressure, and reduced propensity for clogging, as compared to a similar dispense tip having an outlet hole formed using a 0.006 inch outer-diameter drill bit, since such a similarly formed dispense tip would have a constant inner diameter of 0.006 inches along its length, including at its input end 235. In addition, the aforementioned fabrication methods can equally be applied to other types of dispense tips, for example, dispense tips formed according to other means, such as molded dispense tips.

Figure 4A:
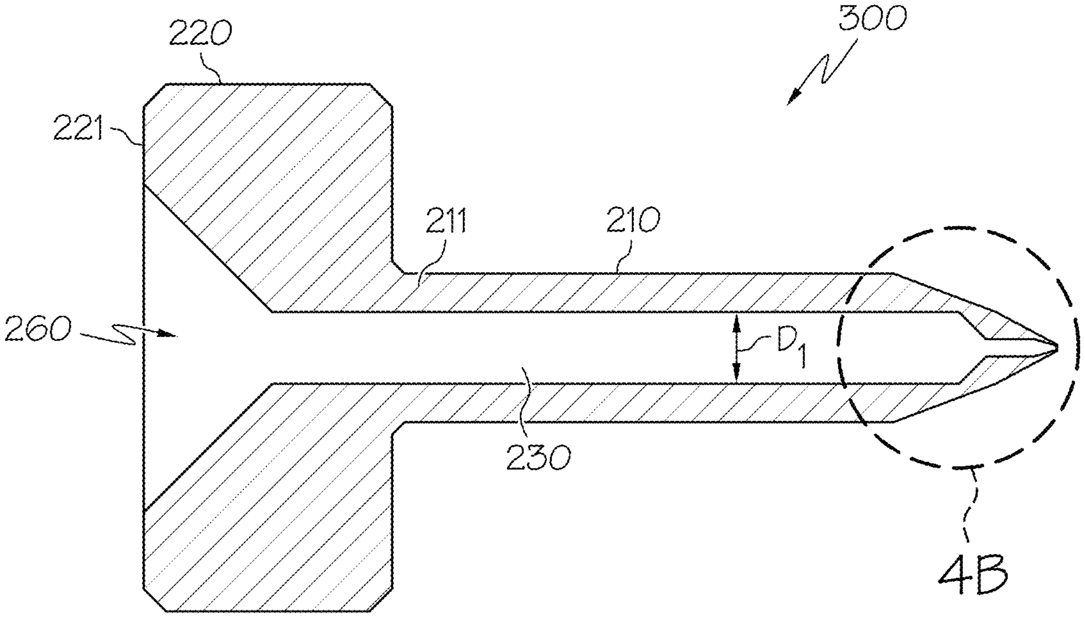
FIG. 4A is an illustrative cross-sectional view of a dispense tip in accordance with another embodiment of the present invention.
Figure 4B:
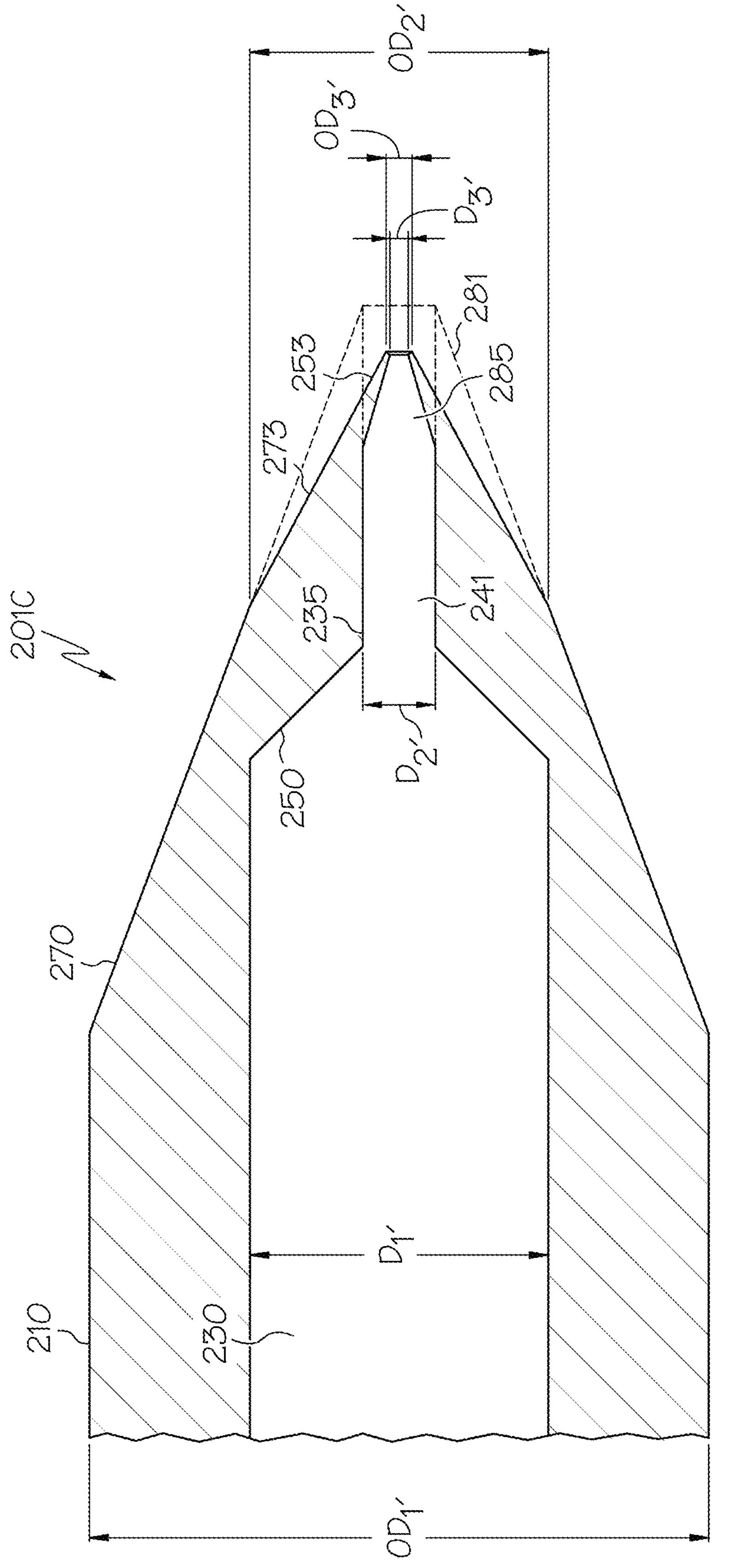
FIG. 4B is an enlarged partial cross-sectional view of the dispense tip neck of FIG. 4A.

FIG. 4A is an illustrative cross-sectional view of a dispense tip 300 in accordance with another embodiment of the present invention. FIG. 4B is an enlarged partial cross-sectional view of the dispense tip neck 300 of FIG. 4A. As shown in FIGS. 4A-4B, a reduced-diameter outlet hole 285 is formed at an output end portion of an outlet hole 241 at the outlet hole region 201C of the neck 210. The initial configuration of the outlet hole 285 prior to reduction is represented in FIG. 4B by dashed lines 281. In contrast to the embodiment shown in FIGS. 2A-2B, the input end 235 of the outlet hole 241 shown in the embodiment of FIGS. 4A-4B has an inner diameter $D_2'$ that uniformly extends through a substantial portion of the output end of the neck 210 to the outlet hole 285. A tapered inner surface 253 transitions from the end of the elongated input end 235 having the inner diameter $D_2'$ to the output end of the outlet hole 285 having a substantially reduced inner diameter $D_3'$. In addition, an outer taper 273 at the distal end of the neck 210 transitions an outer surface having a second outer diameter $OD_2'$, for example, in the region of the body of the outlet hole 285, to an outer surface having a third outer diameter $OD_3'$ that is in a region of the neck proximal to an opening at the output end of the outlet hole 285.

Figure 5:
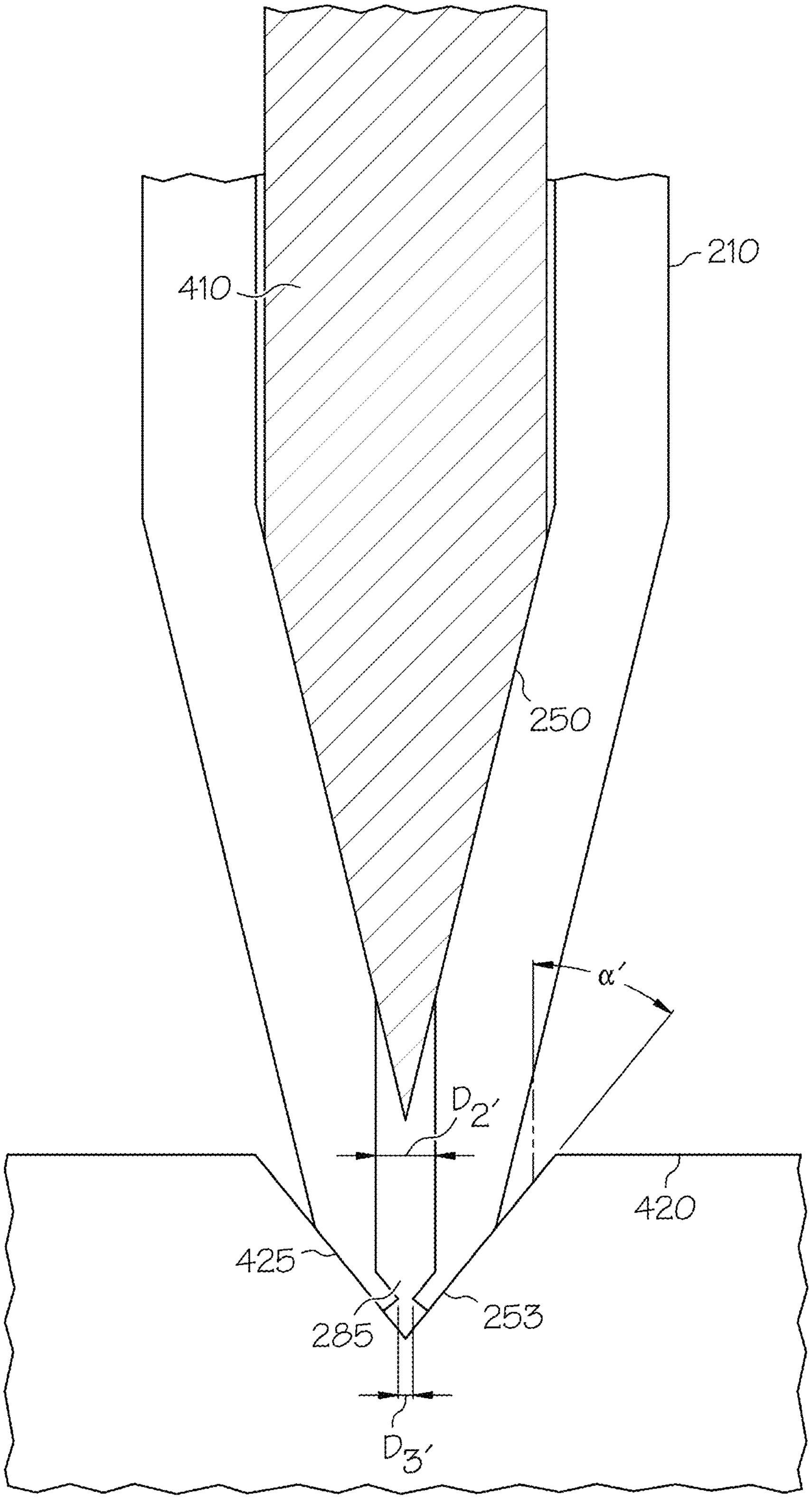
FIG. 5 is an illustrative cross-sectional view showing an outlet hole of the dispense tip of FIGS. 4A-4B being formed in accordance with an embodiment of the present invention.

FIG. 5 is an illustrative cross-sectional view showing an outlet hole 285 of the dispense tip of FIGS. 4A-4B being formed in accordance with an embodiment of the present invention. A dispense tip is formed in a similar manner as described at FIGS. 3A-3C. However, the shape of the impression 425 and/or the force of the punch 410 being applied to the first inner taper 250 in FIG. 5 is different than the shape of the impression 325 and/or the force of the punch 310 that is applied in the embodiment shown in FIGS. 3A-3C. Specifically, the geometry of the outlet hole 285 shown in FIG. 5 is influenced by factors such as the amount of force applied by the punch 410 against the dispense tip or the angle α' of the wall of the impression 425, resulting in the outlet hole 285 in FIG. 5 assuming a different configuration than that of the outlet hole 240 shown in FIG. 3C.

Figure 6A:
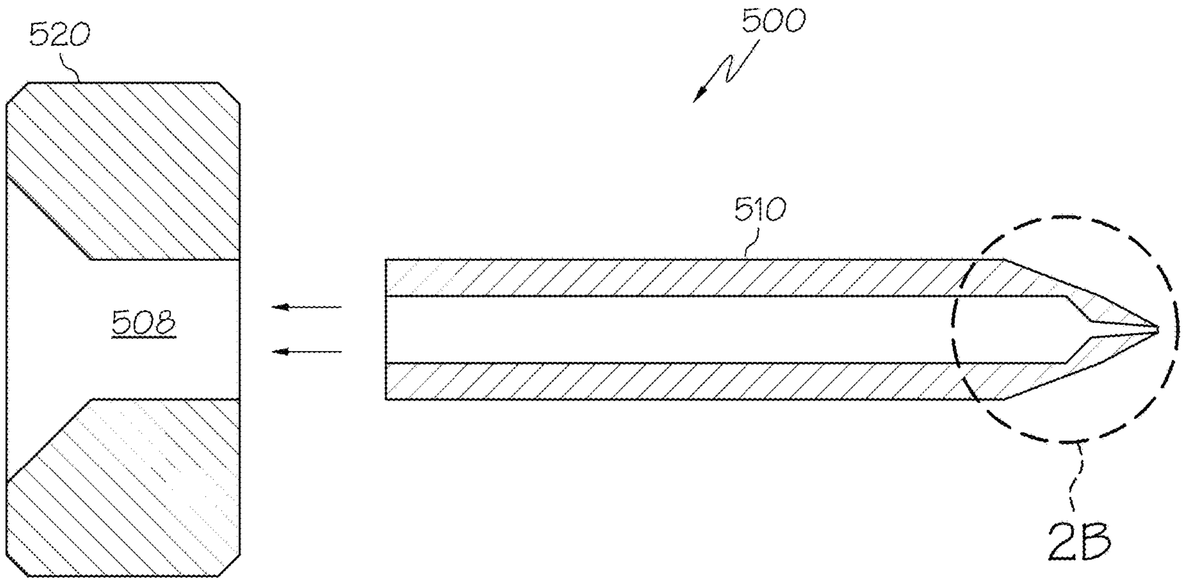
FIGS. 6A-6B are illustrative cross-sectional views of a dispense tip formed by a combination of a separately machined neck being joined to a body in accordance with an embodiment of the present invention.
Figure 6B:
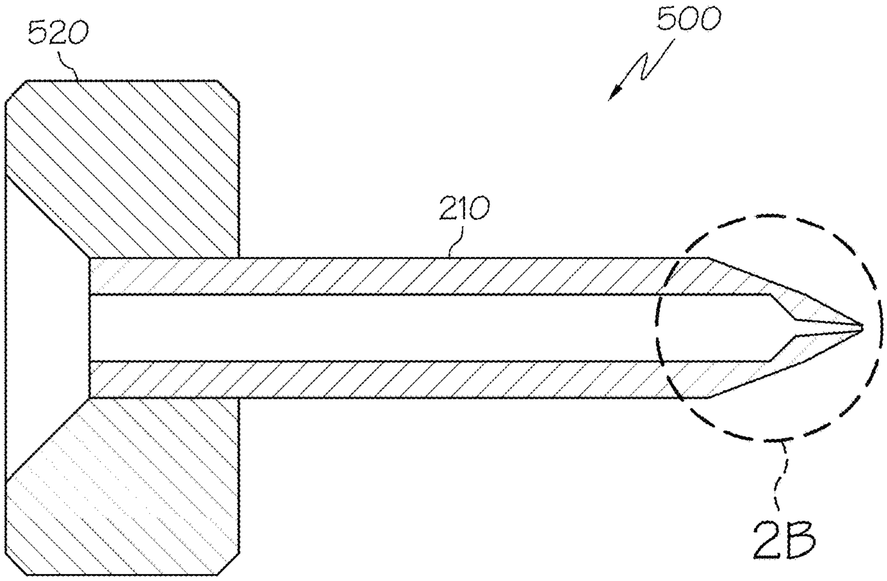

FIGS. 6A-6B are illustrative cross-sectional views of a dispense tip 500 formed by a combination of a separately machined neck 510 being joined to a body 510 in accordance with an embodiment of the present invention. The neck 510 includes the advantageous configuration of a dispense tip having a reduced-diameter outlet in accordance with the embodiments described above. A hole 508 is formed in the body 520, and the neck 510 is press-fit, bonded, or welded into position in the hole 508.

Figure 7:
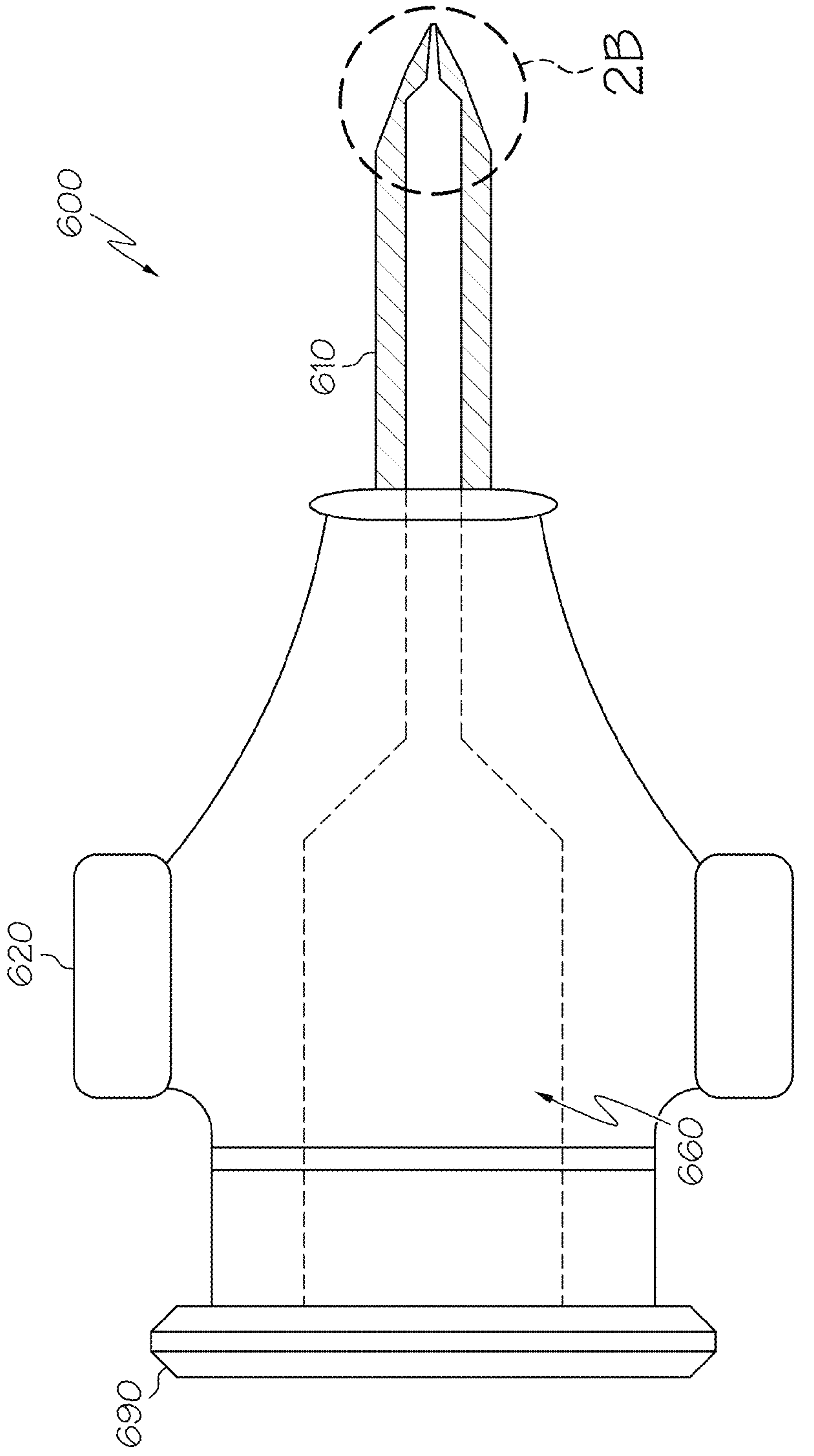
FIG. 7 is an illustrative cross-sectional view of a dispense tip having a LUER™-style body in accordance with an embodiment of the present invention.

FIG. 7 is an illustrative cross-sectional view of a dispense tip 600 having a LUER™-style body 620 in accordance with an embodiment of the present invention. The dispense tip 400 has a LUER™-style body comprising a male LUER™ fitting or coupling 690 at an inlet of the body 620 which is coupled to a female LUER™ fitting (not shown) of a dispense pump. The LUER™-style coupling 690 is formed to comply with the standards of LUER™-style fittings. In an embodiment, The LUER™-style coupling 690 can be machined from a common stock or molded from materials such as plastics or ceramics. In one embodiment, as illustrated at FIG. 7, the outlet region of the dispense tip of FIG. 7 is similar to the outlet region illustrated at FIG. 2B. In another embodiment, the outlet region of the dispense tip of FIG. 7 is similar to the outlet region illustrated at FIG. 4B.

As shown in FIG. 7, the body 620 is machined from a stock that is common with, and unitary with, the neck 610. Such unitary construction provides a dispense tip that is of enhanced strength and rigidity, and therefore leads to more accurate and consistent dispensing. In other embodiments, the body 620 and neck 610 are machined, molded, or otherwise formed, as two independent components, similar to the dispense tip illustrated in FIG. 6. The body 620 is formed to further include a recess (not shown) that is adapted to receive the inlet end of the neck 210 as shown. The neck 610 may be bonded to the body 620, for example, by press-fitting, bonding, or welding. In this manner, an inlet region 660 of the body 220 is funneled to an input port of the neck 610.

The above embodiment illustrated at FIG. 7 therefore offers the advantage of compatibility with a LUER™-style pump fitting, while improving system accuracy and strength over the traditional dispense tip configurations.

As described above, embodiments of the present invention are directed to dispense tips having reduced-diameter outlet holes and methods of manufacturing the same, which permits precise patterns, such as dot and line patterns, with improved accuracy, having very small diameters, to be dispensed. In particular, the dispense tip offers an outlet hole having a smaller diameter than the initial diameter of the hole formed through the dispense tip, the outlet hole diameter resulting in dot or line patterns to be dispensed having a smaller diameter than currently achieved by conventional dispense tips. The reduced-diameter outlet hole is formed by inserting the output end of the dispense tip into a female die impression or cavity, and applying a controlled external force to the input end of the dispense tip or to a male punch that is inserted into a hole that is formed through the neck of the dispense tip. In controlling the amount of external force being applied, the walls of the output end of the dispense tip conform to the geometry of the female die impression to form the outlet hole region. By applying a controlled external force in this manner combined with the geometry of the die impression, this technique results in an opening at the output end of the outlet hole having a very small diameter, thereby capable of achieving a high level of dispensing accuracy.

While embodiments of the invention have been particularly shown and described above, it will be understood by those skilled in the art that various changes in form and detail may be made herein without departing from the spirit and scope of the invention as defined by the appended claims.

What is claimed is:

1. A dispense tip for low-volume dispensing formed according to a process, comprising:

forming a hole through a length of a neck formed of a body of material;

forming an inlet hole at a distal end of the hole, the inlet hole having a first inner diameter;

forming an outlet hole at a distal end of the inlet hole, the outlet hole having a second inner diameter less than the first inner diameter, a first inner taper transitioning the inlet hole from the first inner diameter to the second inner diameter;

forming an outer taper having a width that decreases along a longitudinal axis of the length of the hole in a direction of a distalmost end of the outlet hole to a distalmost end of the neck; and reducing a width of an opening at the distalmost end of the outlet hole to a third inner diameter that is less than the second inner diameter, wherein the distalmost end of the neck and the distalmost end of the outlet hole are positioned along a common horizontal plane.

2. The dispense tip of claim 1, wherein the third inner diameter is 0.003 inches.

3. The dispense tip of claim 1, wherein the outer taper terminates at the distalmost end of the outlet hole having the third inner diameter, wherein at least a portion of the distalmost end of the neck has a thickness between the opening at the distalmost end of the outlet hole and the outer taper that decreases along a longitudinal axis.

4. The dispense tip of claim 1, further comprising: forming a base at an input end of the inlet hole.

5. The dispense tip of claim 4, wherein the base is formed from the body of material.

6. The dispense tip of claim 5, wherein the neck and base are formed of a machinable material.

7. The dispense tip of claim 6, wherein the machinable material includes one or more of stainless steel, copper, brass, aluminum, or alloys thereof.

8. The dispense tip of claim 4, wherein the base is machined, molded, or otherwise formed from one or more of ceramics, composites, and plastics.

9. The dispense tip of claim 4, wherein the base is formed independently of the body of material, and coupled to the body of material.

10. The dispense tip of claim 4, wherein the base comprises a LUER™ lock coupling.

11. The dispense tip of claim 1, wherein the body of material includes a machinable material.

12. The dispense tip of claim 11, wherein the machinable material includes one or more of stainless steel, copper, brass, aluminum, or alloys thereof.

* * * * *